US012322231B2

(12) United States Patent
Uyeda et al.

(10) Patent No.: US 12,322,231 B2
(45) Date of Patent: Jun. 3, 2025

(54) MANUAL ELECTRONIC DEADBOLT

(71) Applicant: ASSA ABLOY Americas Residential Inc., New Haven, CT (US)

(72) Inventors: Alan Uyeda, Irvine, CA (US); Gerald Chong, Mission Viejo, CA (US)

(73) Assignee: ASSA ABLOY Americas Residential, Inc., New Haven, CT (US)

( * ) Notice: Subject to any disclaimer, the term of this patent is extended or adjusted under 35 U.S.C. 154(b) by 35 days.

(21) Appl. No.: 18/257,538

(22) PCT Filed: Dec. 3, 2021

(86) PCT No.: PCT/US2021/061692
§ 371 (c)(1),
(2) Date: Jun. 14, 2023

(87) PCT Pub. No.: WO2022/132458
PCT Pub. Date: Jun. 23, 2022

(65) Prior Publication Data

US 2024/0046725 A1 Feb. 8, 2024

Related U.S. Application Data

(60) Provisional application No. 63/125,722, filed on Dec. 15, 2020.

(51) Int. Cl.
*G07C 9/00* (2020.01)

(52) U.S. Cl.
CPC .................... *G07C 9/00944* (2013.01); *G07C 2009/00833* (2013.01)

(58) Field of Classification Search
CPC .. E05B 19/0082; E05B 47/00; E05B 47/0012; E05B 47/0642; E05B 47/0653;
(Continued)

(56) References Cited

U.S. PATENT DOCUMENTS 5,020,345 A * 6/1991 Gartner ............... E05B 47/0012 70/277
2005/0023846 A1 * 2/2005 Eller ....................... E05B 3/065 292/357
(Continued)

FOREIGN PATENT DOCUMENTS

TW M594052 U 4/2020
WO 2012177609 12/2012
(Continued)

OTHER PUBLICATIONS

International Search Report and Written Opinion for PCT/US2021/061692 (Dec. 3, 2021).

*Primary Examiner* — Nathan Cumar
(74) *Attorney, Agent, or Firm* — Merchant & Gould P.C.

(57) ABSTRACT

An electronically-controlled manually-actuated deadbolt lock is provided. The electronically-controlled manually-actuated deadbolt lock includes an internal spring-actuated coupling mechanism that, when a user is authenticated, the coupling mechanism is placed in an engaged position that allows a deadbolt latch to be moved into a locked or unlocked position responsive to a manual rotation of an external bezel. Because the deadbolt latch is manually driven, a warped door condition can be overcome. Additionally, because the deadbolt latch is manually actuated, operation of the electronic motor may be decreased, which may increase battery life.

21 Claims, 21 Drawing Sheets

(58) Field of Classification Search
CPC ............... E05B 47/068; E05B 47/0688; E05B 47/0692; E05B 2047/0013; E05B 2047/0014; E05B 49/00; G07C 9/00944; G07C 9/23; G07C 9/26; G07C 2009/00952
USPC ........................................................ 70/278.1
See application file for complete search history.

(56) References Cited

U.S. PATENT DOCUMENTS

2008/0011030 A1* 1/2008 Ferreira Sanchez .... E05B 63/16 70/223
2010/0031714 A1* 2/2010 Brown ................ E05B 47/0676 70/91
2010/0257906 A1* 10/2010 Sorensen .............. E05B 47/068 70/91
2011/0079057 A1* 4/2011 Frolov ................ E05B 47/0673 70/91
2014/0157842 A1 6/2014 Almomani et al.
2014/0250956 A1* 9/2014 Chong ............... G07C 9/00944 70/278.1
2015/0114055 A1* 4/2015 Frolov ................ E05B 47/0692 70/266
2017/0194758 A1* 7/2017 Uyeda ..................... E05B 47/00
2017/0354533 A1* 12/2017 Brodbeck .............. A61B 90/90
2019/0213813 A1* 7/2019 Chong .................. E05B 47/026
2020/0080343 A1* 3/2020 Uyeda ................. E05B 27/0003

FOREIGN PATENT DOCUMENTS

WO WO-2012177609 A1 * 12/2012 ............. E05B 47/06
WO 2020055851 3/2020

* cited by examiner

MANUAL ELECTRONIC DEADBOLT

CROSS-REFERENCE TO RELATED APPLICATION

This application is a U.S. National Stage Application of PCT International Patent Application No. PCT/US2021/061692, filed Dec. 3, 2021 which claims the benefit of priority to U.S. Provisional Patent Application No. 63/125,722, filed Dec. 15, 2020, which applications are incorporated herein by reference. To the extent appropriate, a claim of priority is made to each of the above-disclosed applications.

TECHNICAL FIELD

This invention relates to the field of electronic locks. More particularly, this invention relates to systems and methods of providing an electronically-controlled, manually-actuated deadbolt lock.

BACKGROUND

Electronic locks have gained increasing acceptance and widespread use in residential and commercial markets due to various benefits they provide. One such benefit to a user is a convenience of not needing to use a key to open a door. For example, an electronic lock may have a keypad or other means for enabling a user to provide an electronic code, that when authenticated, may cause an electronic motor to retract or extend a deadbolt.

Sometimes, due to age, temperature changes, and/or humidity, doors can experience a warp condition. When this happens, a door may not be able to shut properly and/or deadbolt may not properly align with an opening of a strike plate positioned in a jamb adjacent the door. Accordingly, an electronic deadbolt that uses an electronic motor to retract or extend the deadbolt may be unable to overcome the warped door condition, and the deadbolt may not be able to fully extend into the opening to place the door in a locked state. Additionally or alternatively, in an attempt to overcome the warped door condition to lock or unlock the deadbolt, additional force may be applied by the electronic motor, which may decrease battery life of the electronic lock.

SUMMARY

Aspects of the present disclosure relate generally to an electronically-controlled, manually-actuated deadbolt lock. The electronically-controlled, manually-actuated deadbolt lock includes an internal spring-actuated coupling mechanism that, when a user is authenticated (e.g., a correct passcode or other security token is entered into a keypad of the lock, a biometric input is received, a radio frequency identification (RFID) signal is received), is placed in an engaged position that allows the deadbolt latch to be moved into a locked or unlocked position responsive to a manual rotation of an external bezel. Because the deadbolt latch is manually driven, a warped door condition can be overcome without requiring additional electrical energy from a motor. Additionally, when the deadbolt latch is manually actuated, operation of the electronic motor may be decreased, which may increase battery life.

In a first aspect, an electronically-controlled, manually-actuated lock is provided, wherein the electronic lock comprises: a motor; an actuating spindle actuatable by the motor and positioned to rotate around a first axis in response to actuation of the motor, the actuating spindle comprising a driving pin that engages a transmission spring such that, upon rotation of the actuating spindle, a position of the transmission spring changes relative to the driving pin along the first axis between a neutral position and a biasing position; a bezel assembly positioned to rotate around a second axis and comprising a bezel rotatably coupled to a sleeve within which a bore is defined that is operatively engageable by a pin movable between an engaged position, in which the pin partially resides within and extends through the bore and is received in a recess defined in a coupling, and a disengaged position, in which the pin is disengaged from the coupling; a flange at least partially surrounding the bezel assembly, the pin, and an actuator spring, the flange being engageable by the transmission spring at least when the transmission spring is in the biasing position, the flange being movable between a first position and a second position, wherein: the flange remains in the first position when the transmission spring is in the neutral position; the flange is biased toward the second position when the transmission spring is in the biasing position; and biasing the flange toward the second position compresses the actuator spring, which pushes the pin toward the engaged position; a deadbolt latch assembly including: a latch bolt movable between a locked position and an unlocked position; and a torque blade rotatably coupled to the coupling and drivably coupled to the latch bolt, wherein: when the pin is in the engaged position, manual rotation of the bezel around the second axis rotates the torque blade around the second axis and drives movement of the latch bolt from the locked position to the unlocked position or from the unlocked position to the locked position.

In another aspect, a method is provided for operating an electronically-controlled, manually-actuated lock, comprising in response to receiving a valid user credential input, actuating a motor via a control circuit to rotate an actuating spindle around a first axis, the actuating spindle comprising a driving pin that engages a transmission spring to move the transmission spring along the first axis from a neutral position to a biasing position, wherein: movement of the transmission spring to the biasing position biases a movable flange from a first position to a second position; biasing the flange to the second position compresses an actuator spring, which pushes a pin toward an engaged position, wherein: in the engaged position, the pin engages a bezel assembly and a coupling rotatably coupled to a torque blade that is further drivably coupled to a latch bolt; and in response to receiving a manual rotation of a bezel included in the bezel assembly around a second axis, rotating the torque blade around the second axis and driving the latch bolt to a locked position or an unlocked position.

In another aspect, a locking assembly is provided for use on a door separating an exterior space from a secured space, comprising: an electronic actuating mechanism comprising a motor for actuating an engagement mechanism to drivably couple a bezel assembly to a latch assembly via a coupling mechanism, the engagement mechanism comprising: an actuating spindle including a driving pin, wherein: the actuating spindle is positioned to rotate around a first axis in response to actuation of the motor; and upon rotation of the actuating spindle, the driving pin is configured to engage a transmission spring and bias the transmission spring relative to the driving pin along the first axis between a neutral position and a biasing position; and a flange engageable by the transmission spring at least when the transmission spring is in the biasing position, the flange being movable between a first position and a second position, wherein the flange is biased toward the second position when the transmission spring is in the biasing position; the coupling mechanism, comprising: an actuator spring engageable by the flange, wherein the actuator spring is decompressed when the flange is in the first position and compressed when the flange is biased toward the second position; a pin engageable by the actuator spring and movable between a disengaged position and an engaged position; wherein the pin is moved to the engaged position when the actuator spring is compressed; and a coupling drivably coupled to the latch assembly and within which a recess is defined and dimensioned to receive the pin; wherein the coupling receives the pin when the pin is in the engaged position; the bezel assembly, comprising: a bezel positioned to rotate around a second axis; and a sleeve rotatably coupled to the bezel and within which a bore is defined that is operatively engageable by the pin; wherein: when the pin is in the engaged position, the pin partially resides within and extends through the bore and is received in the recess defined in the coupling; and when the pin is in the disengaged position, the pin is disengaged from the coupling; and the latch assembly, comprising: a latch bolt movable between a locked position and an unlocked position; a latch spindle configured to drive movement of the latch bolt between the locked position and the unlocked position; and a torque blade rotatably coupled to the coupling and drivably coupled to the latch spindle, wherein: when the pin is in the engaged position, manual rotation of the bezel around the second axis rotates the torque blade around the second axis and causes the latch spindle to drive movement of the latch bolt from the locked position to the unlocked position or from the unlocked position to the locked position.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
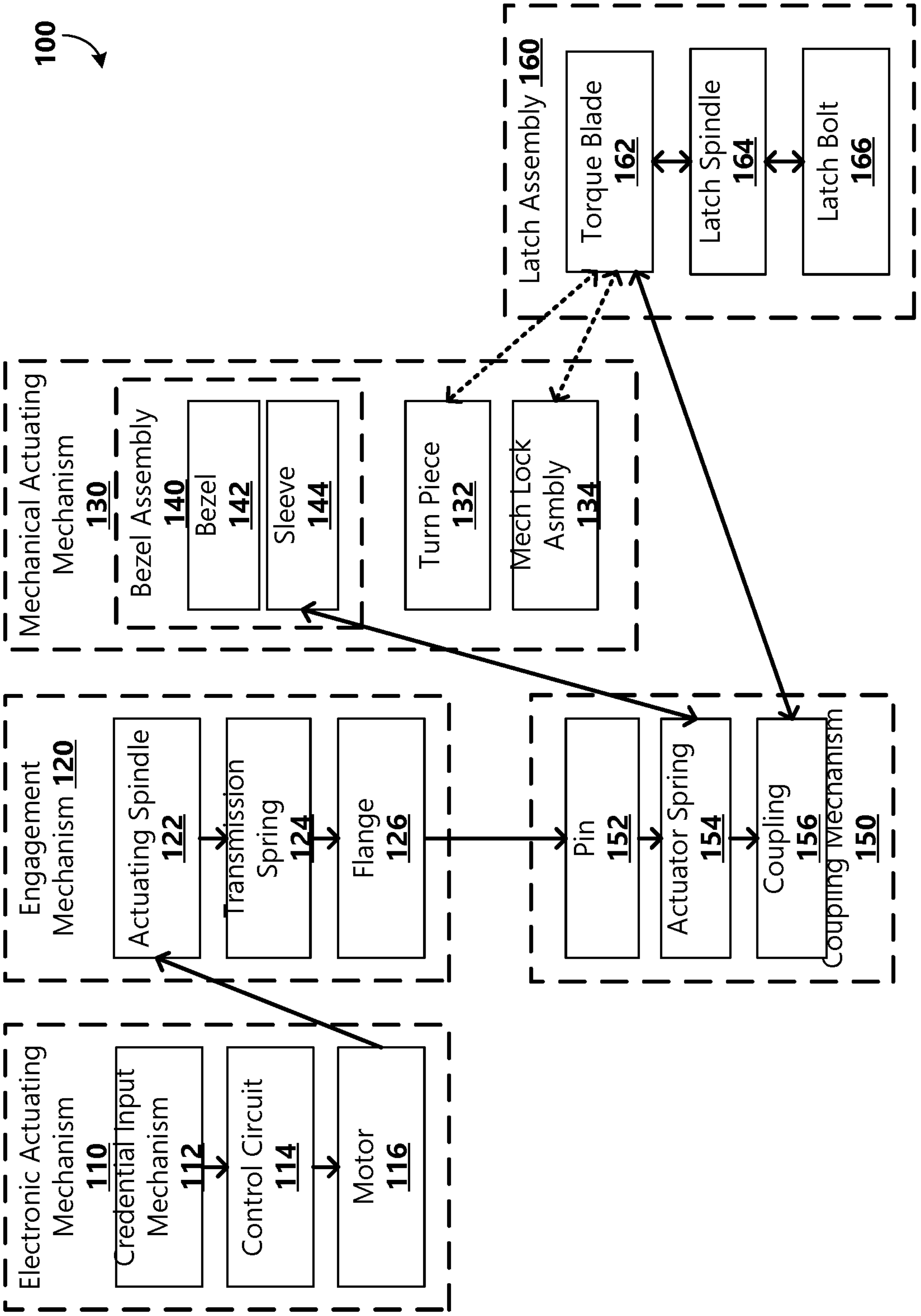
FIG. 1 illustrates a schematic representation of an example electronic lock according to an embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, the present disclosure relates generally to providing a manually-actuated, electronically-controlled deadbolt lock. According to an aspect, the electronic lock includes an externally-located rotatable bezel that is configured to selectively manually drive a deadbolt latch into a locked or unlocked position. Unlike existing electronic locks which include a transmission, clutch, and a preload device, the electronic lock as disclosed includes an internal spring-actuated coupling mechanism that, when a user is authenticated via an authentication method, is placed in an engaged position. When the spring-actuated coupling mechanism is in an engaged position, manual rotation of the external bezel may drive movement of the deadbolt latch into the locked or unlocked position. Embodiments herein describe an electronic lock that can overcome warped door conditions and extend battery life.

The term “lock” or “lockset” is broadly intended to include any type of lock, including but not limited to, deadbolts, knob locks, lever handle locks, mortise locks, and slide locks, whether mechanical, electrical, or electro-mechanical locks. The locking points may have various mounting configurations and/or locations, including but not limited to: mortised within the doorframe, mounted externally to the doorframe or support structure, and/or affixed directly to the door. Although this disclosure describes these features as implemented on an electronic deadbolt lock for purposes of example, these features are applicable to any type of lockset, including but not limited to, deadbolts, knobset locks, handleset locks, etc.

Figure 2B:
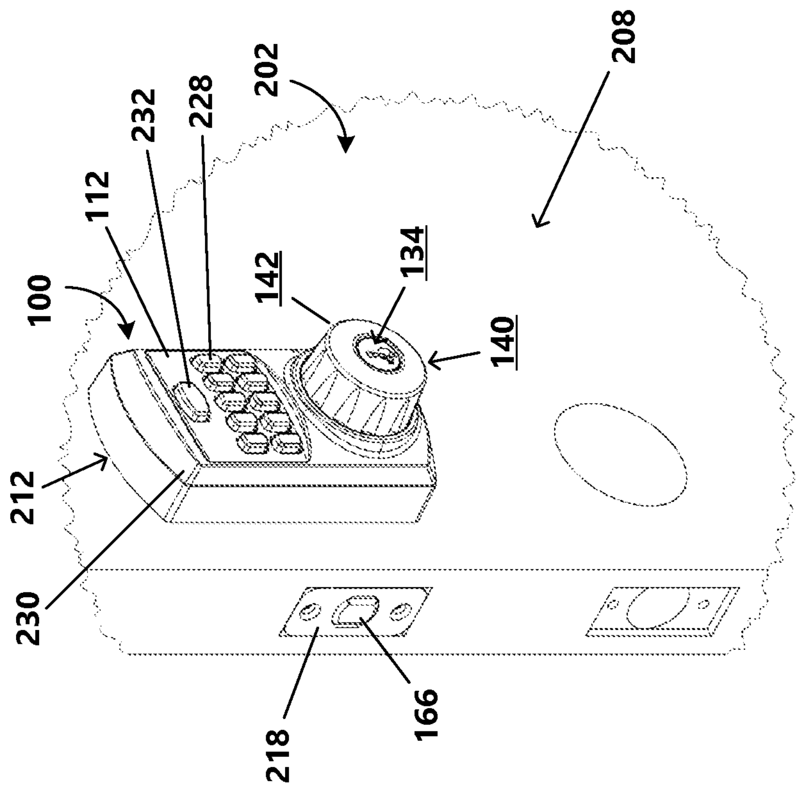
FIG. 2B illustrates a perspective view of a portion of an exterior assembly of the example electronic lock.
Figure 2A:
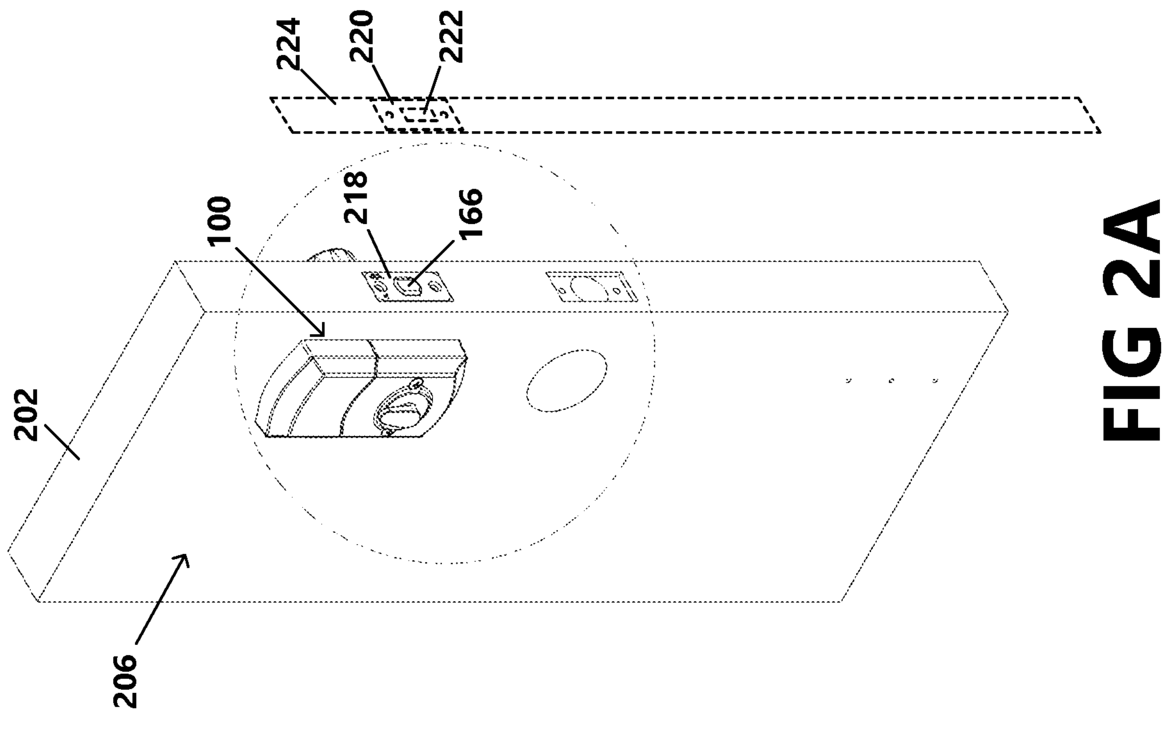
FIG. 2A illustrates a perspective view of the example electronic lock installed in a door.
Figure 2C:
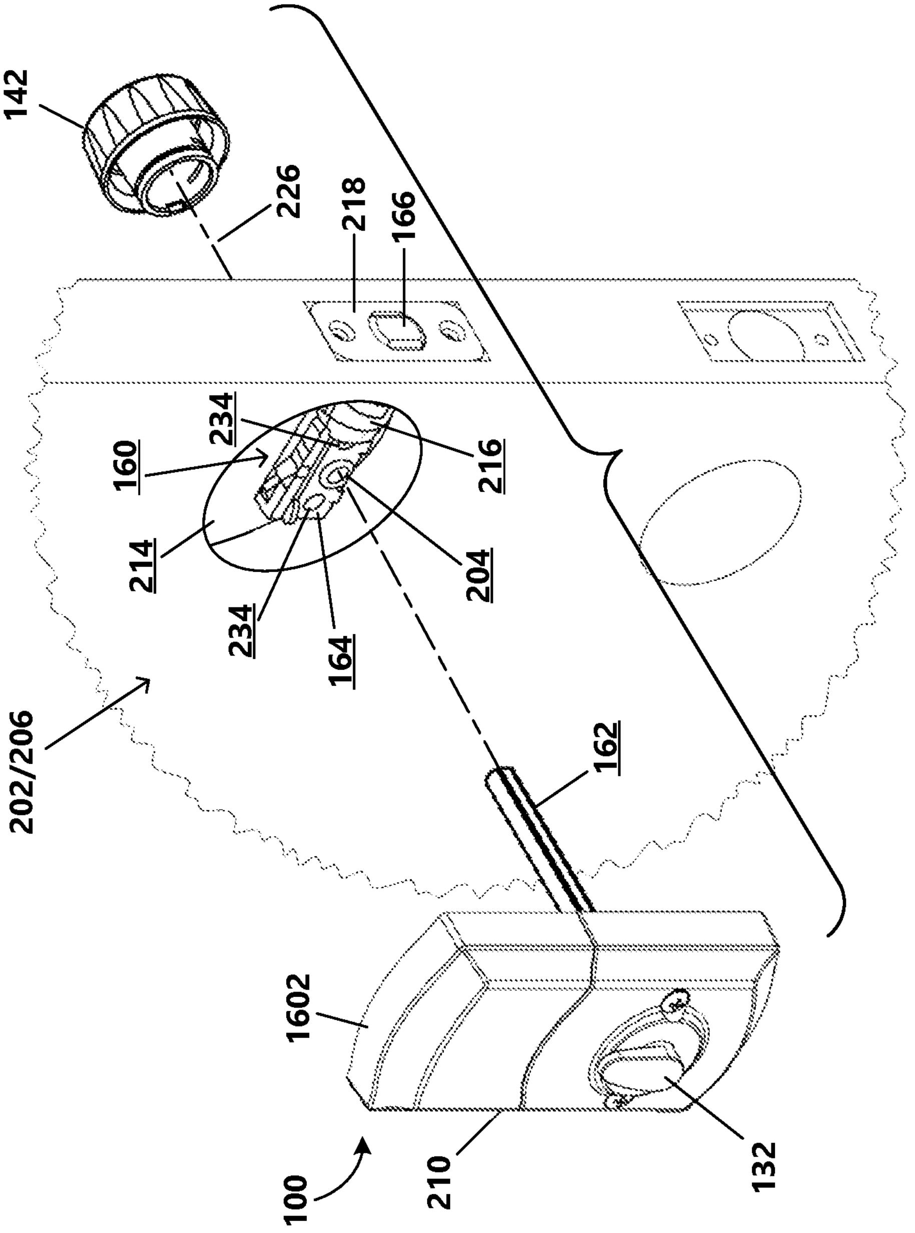
FIG. 2C illustrates a partially-exploded perspective view of a portion of an interior assembly, a deadbolt assembly, and a portion of a bezel assembly of the example electronic lock.
Figure 3:
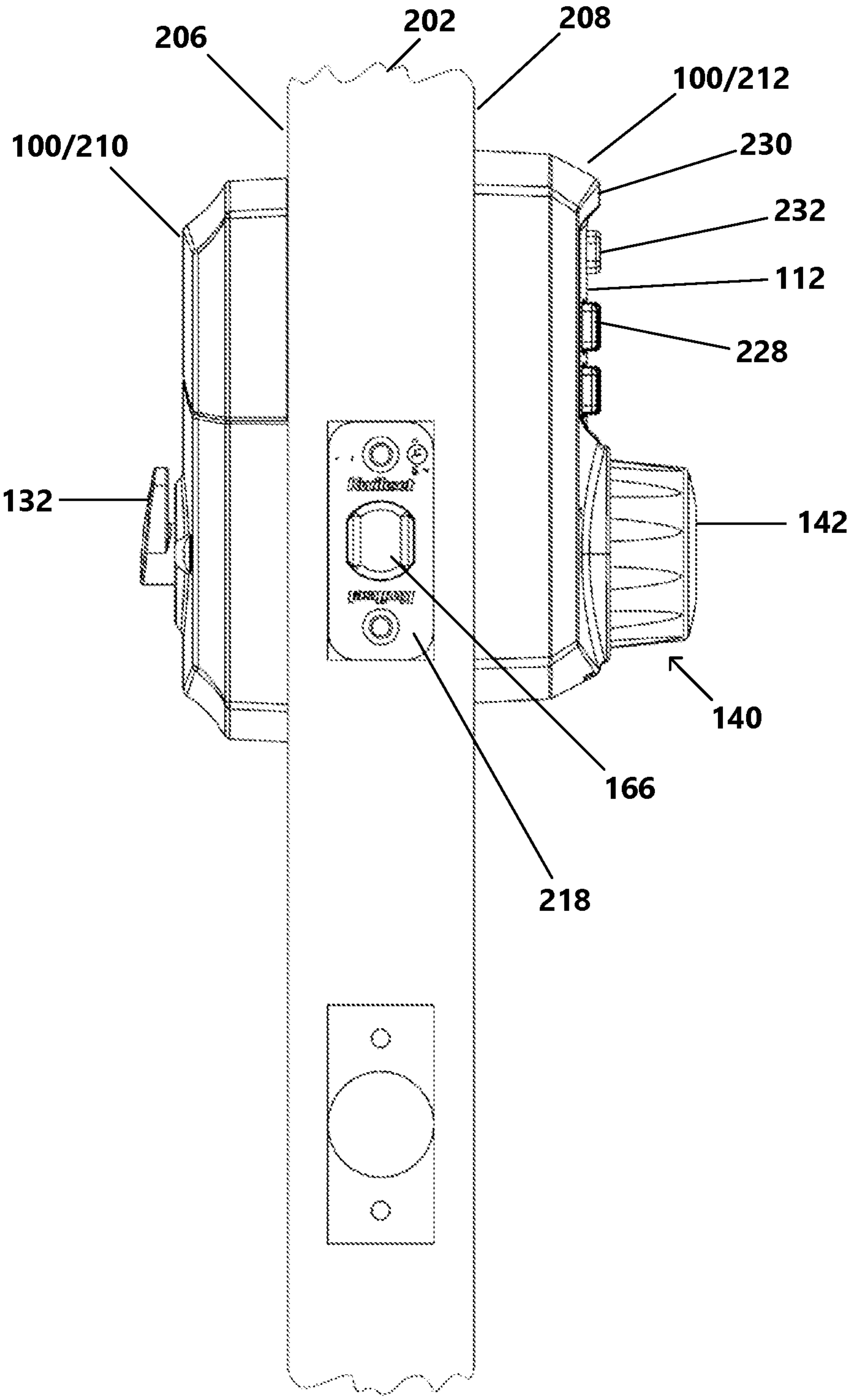
FIG. 3 illustrates a side view of the example electronic lock installed in a door.
Figure 4:
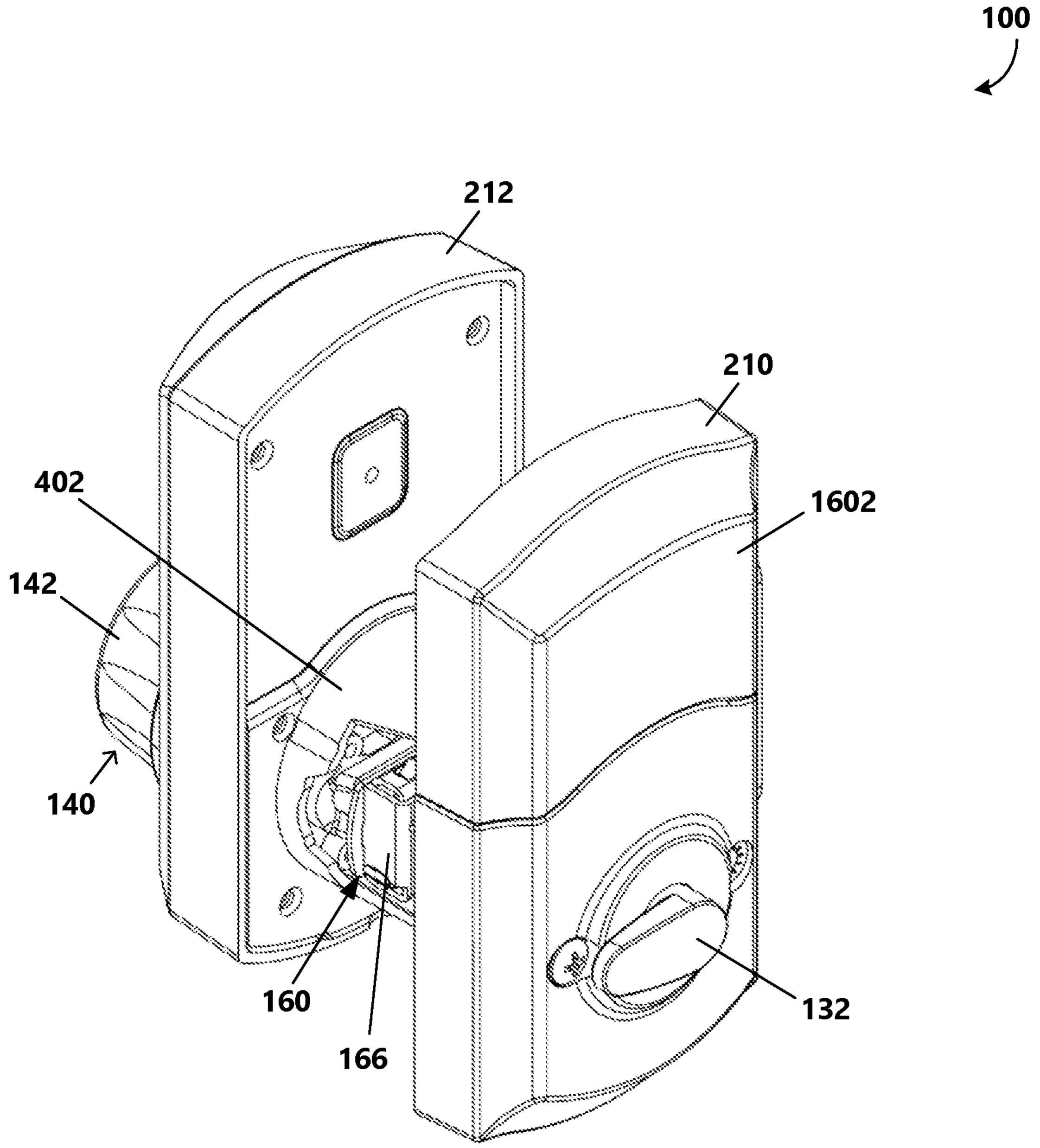
FIG. 4 illustrates a front perspective view of the interior assembly and a rear perspective view of a portion of the exterior assembly of the example electronic lock.

FIG. 1 is a block diagram showing a schematic representation of an example electronic lock 100 according to an embodiment of the present disclosure. The schematic representation provided in FIG. 1 is intended to simplify and facilitate discussion herein of functional relationships between components of the electronic lock 100, while reference may be made to FIGS. 2-17, which provide various perspective representations of the electronic lock 100 that are intended to facilitate communication of the assembly and mating relationships of these components. As shown in FIGS. 2A-2C, the electronic lock 100 is configured to be mounted on a door 202. The door 202, can be an exterior entry door or an interior door, and has an interior side 206 and an exterior side 208. With an exterior entry door 202, for example, the exterior side 208 may be outside a building, while the interior side 206 may be inside a building. With an interior door 202, the exterior side 208 may be inside a building, but may refer to outside a room secured by the electronic lock 100, and the interior side 206 may refer to inside the secured room. The electronic lock 100 generally includes an interior assembly 210, an exterior assembly 212, and a deadbolt latch assembly 160. Typically, the interior assembly 210 is mounted to the interior side 206 of the door 202 and the exterior assembly 212 is mounted to the exterior side 208 of the door 202.

The interior assembly 210 generally houses internal components of the internal assembly 210 as explained below, and includes a mechanical actuating mechanism 130 embodied as a turn piece 132 that may be rotated by a user to manually operate the deadbolt latch assembly 160. The exterior assembly 212 generally includes an electronic actuating mechanism 110, an engagement mechanism 120, a coupling mechanism 150, a mechanical actuating mechanism 130 embodied as a bezel assembly 140 and a mechanical actuating mechanism 130 embodied as a lock cylinder 134.

Figure 5:
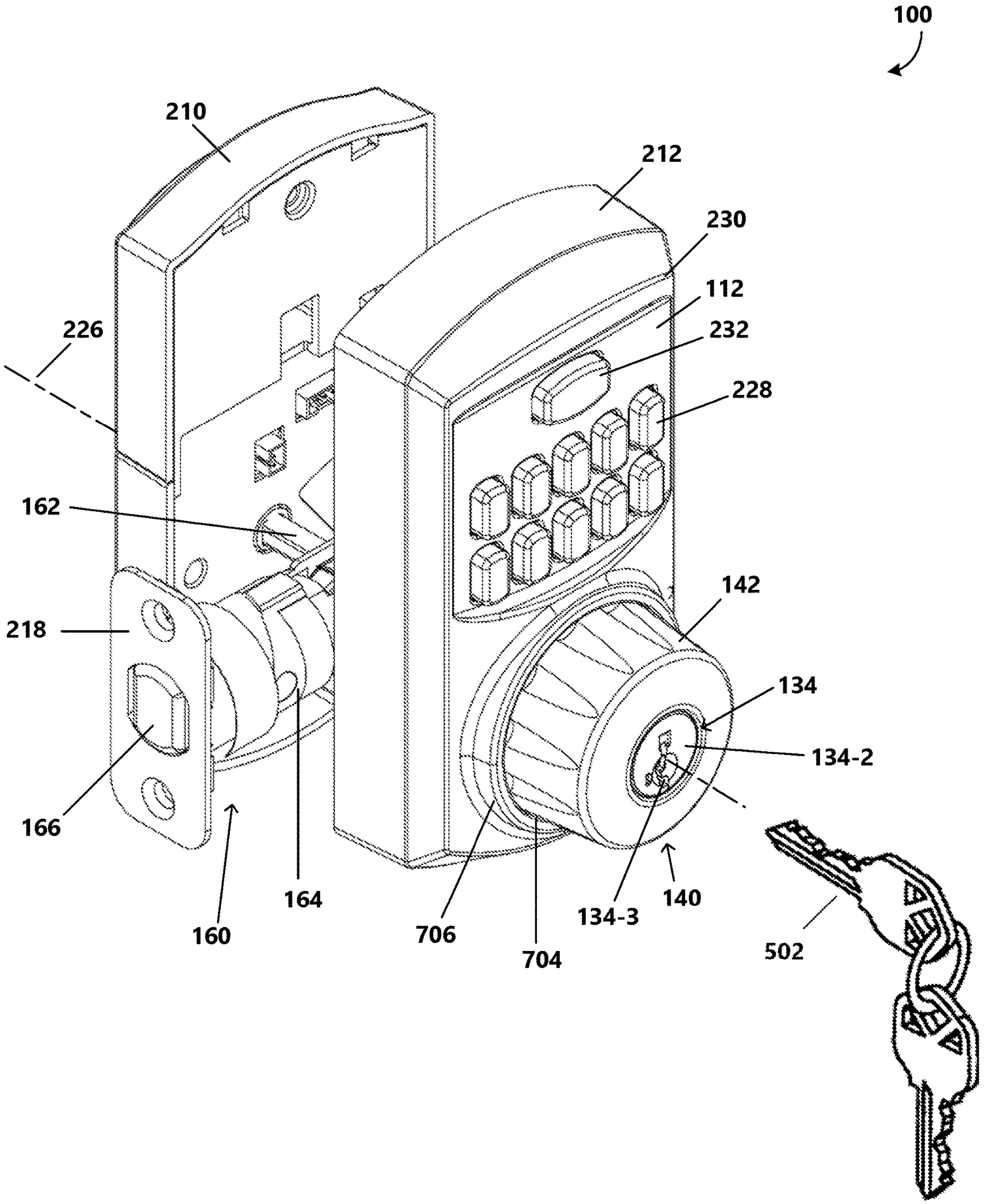
FIG. 5 illustrates a front perspective view of the exterior assembly and a rear perspective view of a portion of the interior assembly of the example electronic lock.

The latch assembly 160, is best shown in FIGS. 2C and 5. The latch assembly 160 generally comprises a torque blade 162, a latch bolt 166 that extends into a locked position and retracts into an unlocked position, and a latch spindle 164 that connects the torque blade 162 to the latch bolt 166. As shown in the partially exploded perspective view in FIG. 2C, the latch assembly 160 is at least partially mounted in a bore 214 formed in the door 202 and is designed to be actuated manually by a mechanical actuating mechanism 130 to extend and retract the latch bolt 166. The latch assembly 160 is at least partially housed in an adaptor 402 (shown in FIGS. 4, 7A, 7B, and 9) that defines a recessed area for internal components. The latch assembly 160 may include a housing 216 that carries the extendable/retractable latch bolt 166. The latch bolt 166 moves linearly in and out of the housing 216.

Figure 7A:
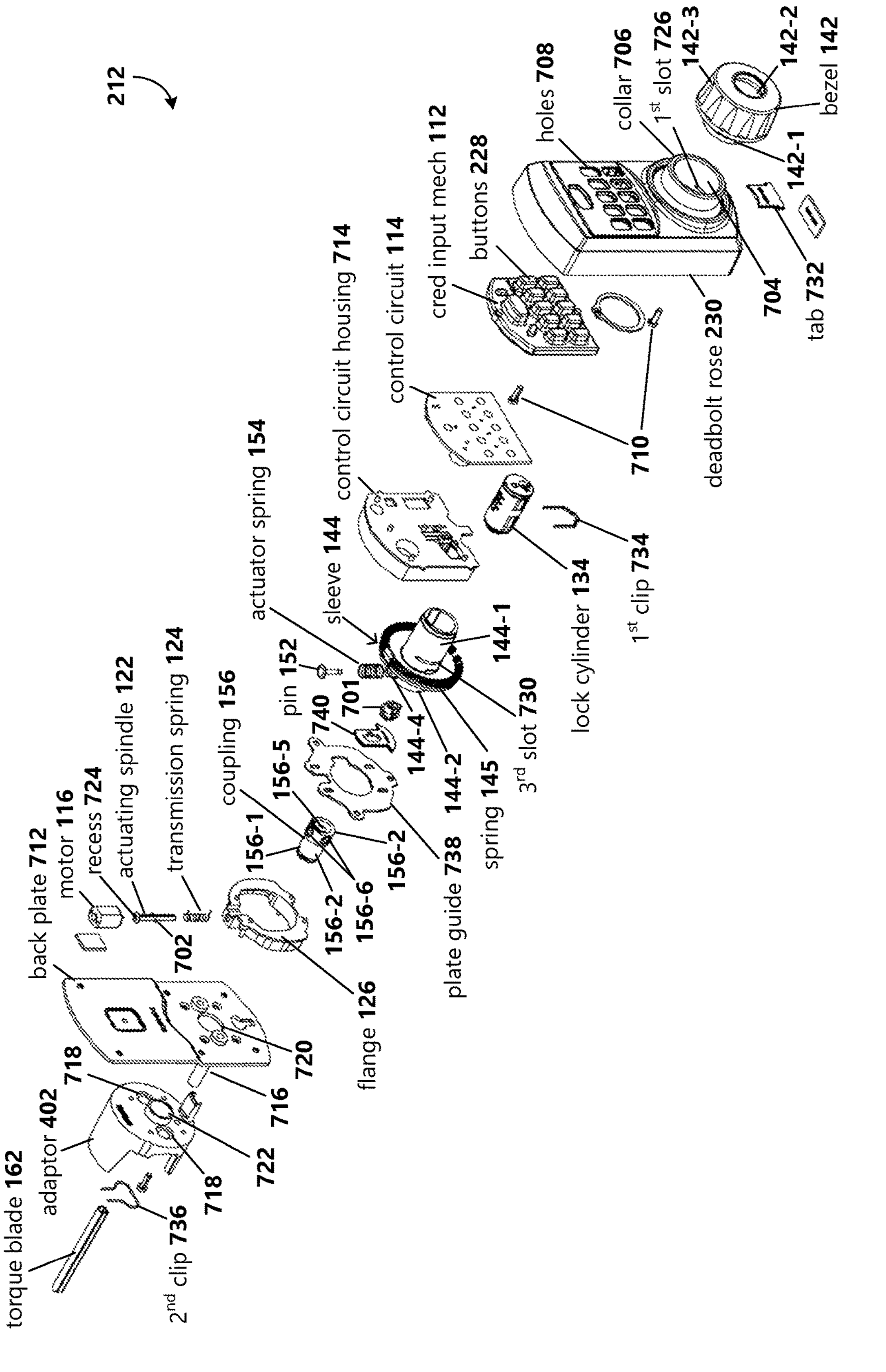
FIG. 7A illustrates an exploded view of internal components of the exterior assembly as viewed from a front perspective of the example electronic lock.
Figure 7B:
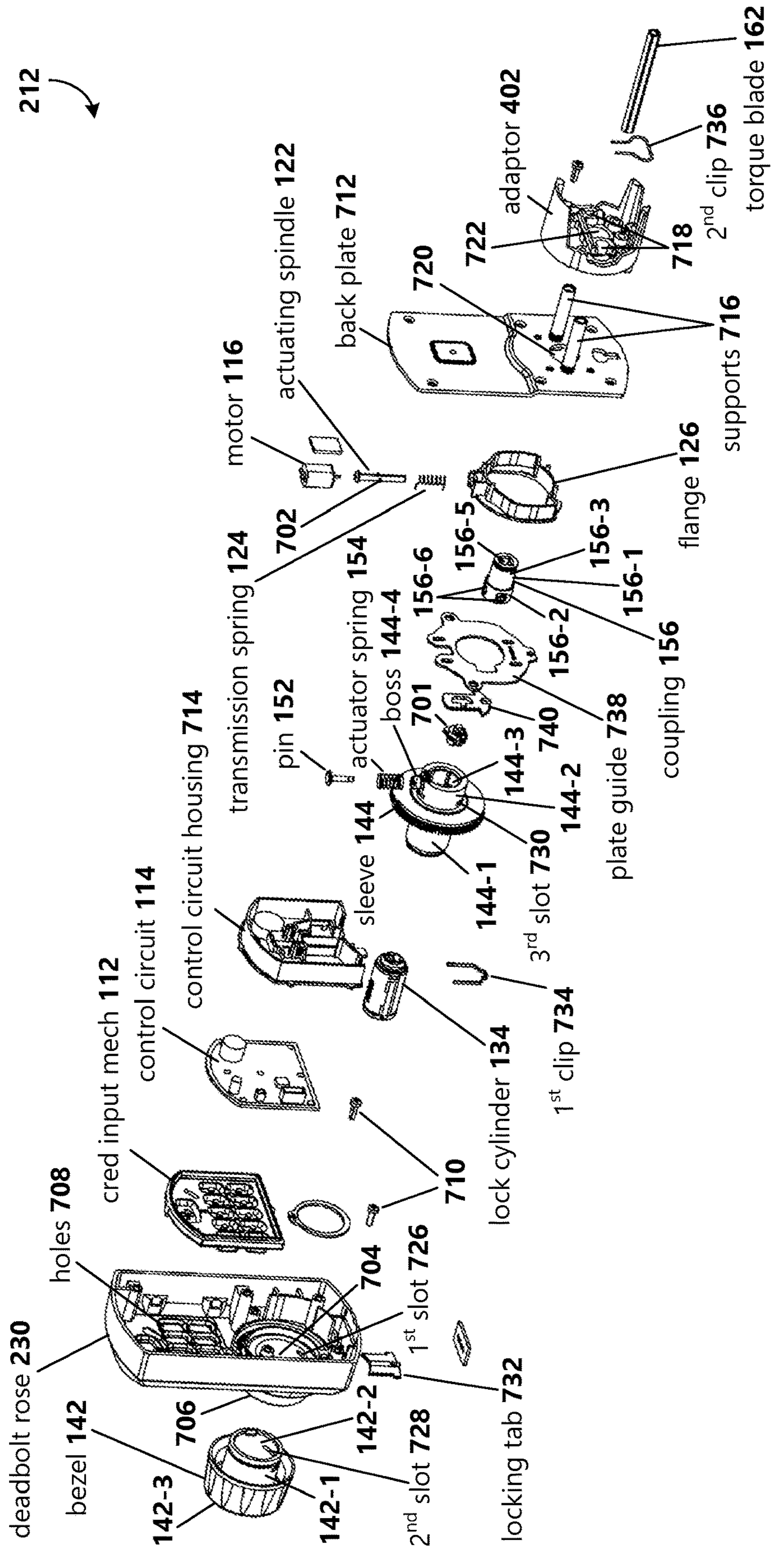
FIG. 7B illustrates an exploded view of the internal components of the exterior assembly as viewed from an rear perspective of the example electronic lock.
Figure 9:
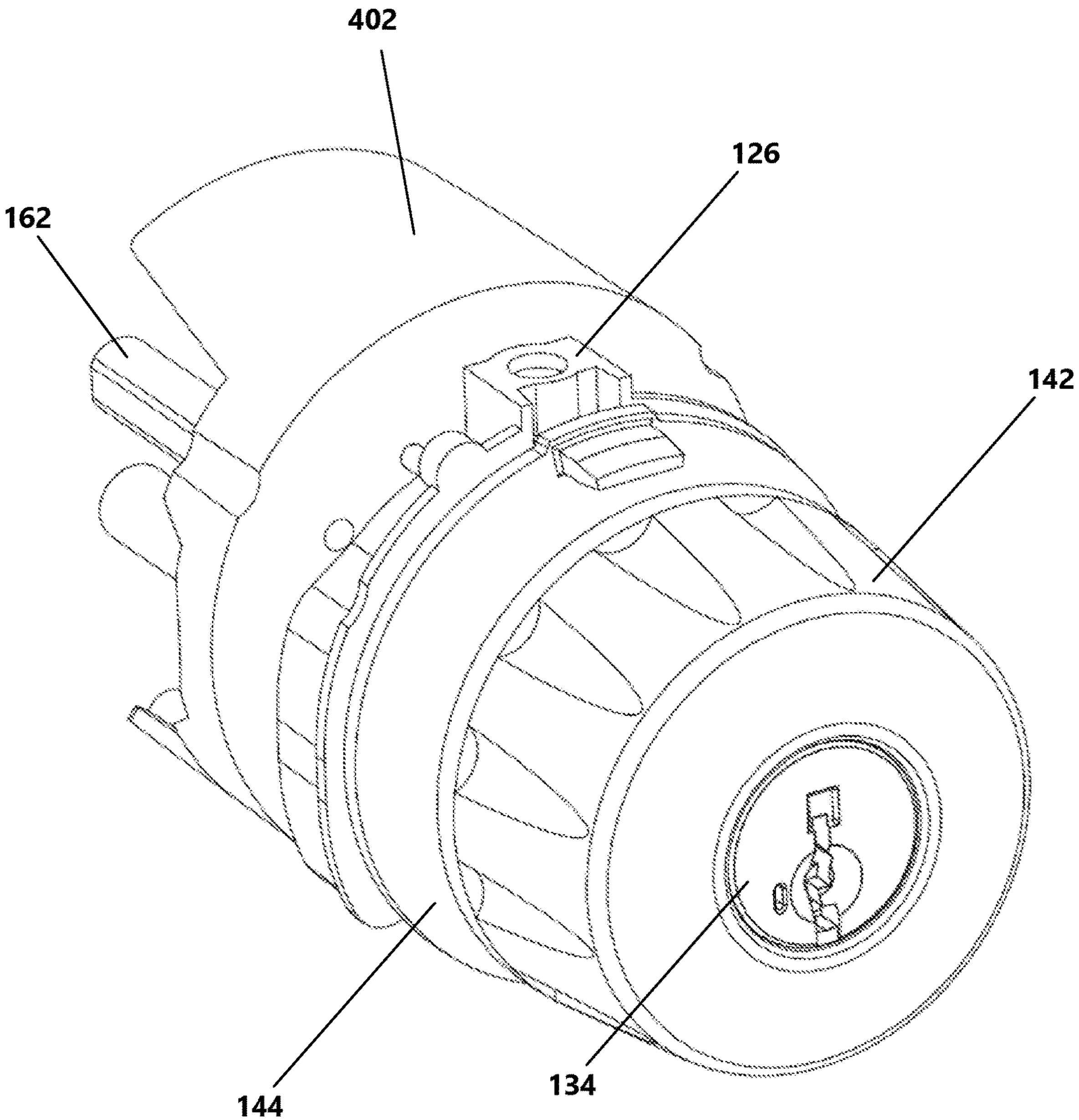
FIG. 9 illustrates a front perspective view of the bezel assembly and adaptor of FIGS. 8A and 8B.
Figure 10:
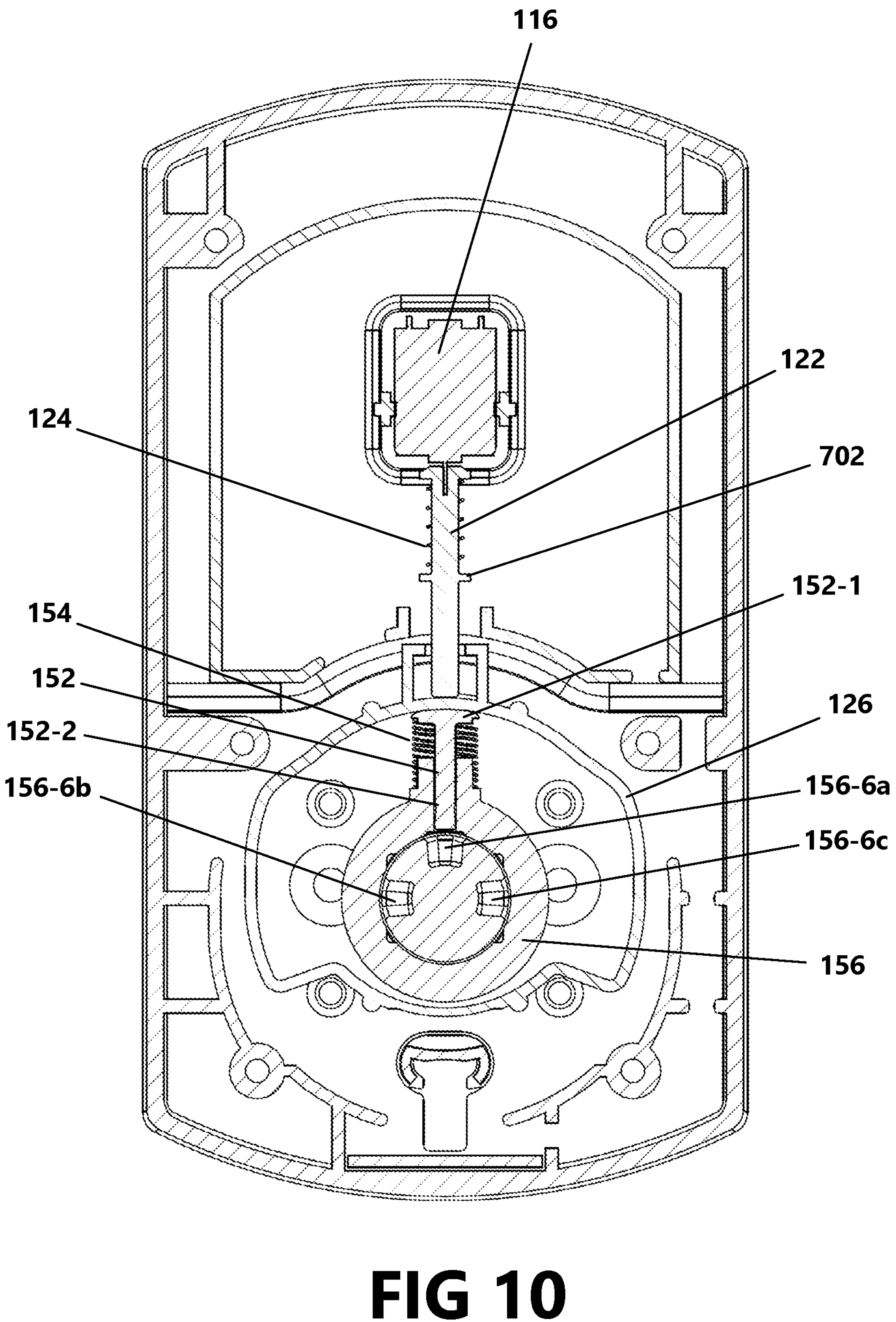
FIG. 10 illustrates a rear view of the internal mechanisms of the example electronic lock in an unengaged state.

As is best shown in FIGS. 7A, 7B, and 9, the torque blade 162 is non-circular (e.g., having a square or D-shaped cross-section), and has a first end that is operatively connected to the lock cylinder 134 and extends longitudinally therefrom. The torque blade 162 is configured to drive the latch spindle 164 by a rotation of the torque blade 162. Thus, the torque blade 162 is configured to be drivably received in an opening (i.e., a spindle passage 204) in the latch spindle 164 that corresponds to a cross section shape (e.g., square, D-shaped) of torque blade 162. When the torque blade 162 is rotated in a first direction, a rotational force is conveyed to the latch spindle 164, which causes the latch bolt 166 to extend into a locked position. When the torque blade 162 is rotated in the opposing direction, a rotational force is conveyed to the latch spindle 164, which causes the latch bolt 166 to retract into an unlocked position. When the latch bolt 166 is in a retracted position, one end of the latch bolt 166 is generally flush with a latch plate 218. In some examples, the latch plate 218 may be attached to the door 202 with fasteners. When the latch bolt 166 is in an extended position, the latch bolt 166 protrudes through an opening of the latch plate 218 and through an opening 222 of a strike plate 220 positioned in the adjacent doorjamb 224. As is typical, the strike plate 220 may be made of metal, recessed in the doorjamb 224, and may be attached to the doorjamb 224 using fasteners. The strike plate 220 is configured to receive the latch bolt 166 when the door 202 is closed and when the latch bolt 166 is extended. A retracted position is broadly used to denote an “unlocked” position and an extended position is broadly used to denote a “locked” position. As mentioned previously, sometimes, the door 202 may experience a warp condition where the door may not be able to shut properly and/or the latch bolt 166 may not properly align with the opening 222 of the strike plate 220.

Figure 13:
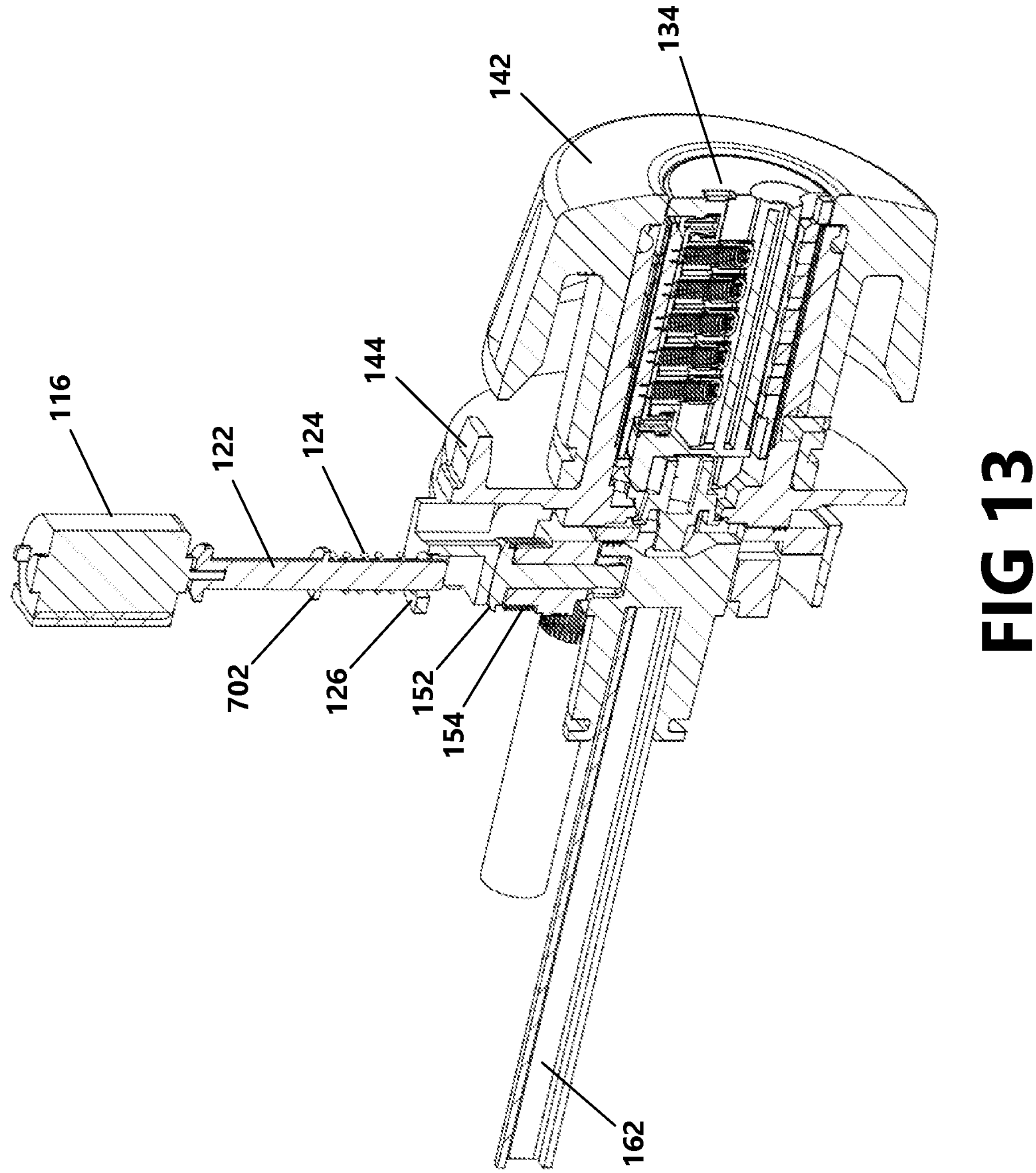
FIG. 13 illustrates a perspective cross-sectional view of the bezel assembly, the mechanical lock assembly, a motor, an engagement mechanism, and a coupling mechanism of the example electronic lock, wherein the electronic lock is in an engaged state.
Figure 14:
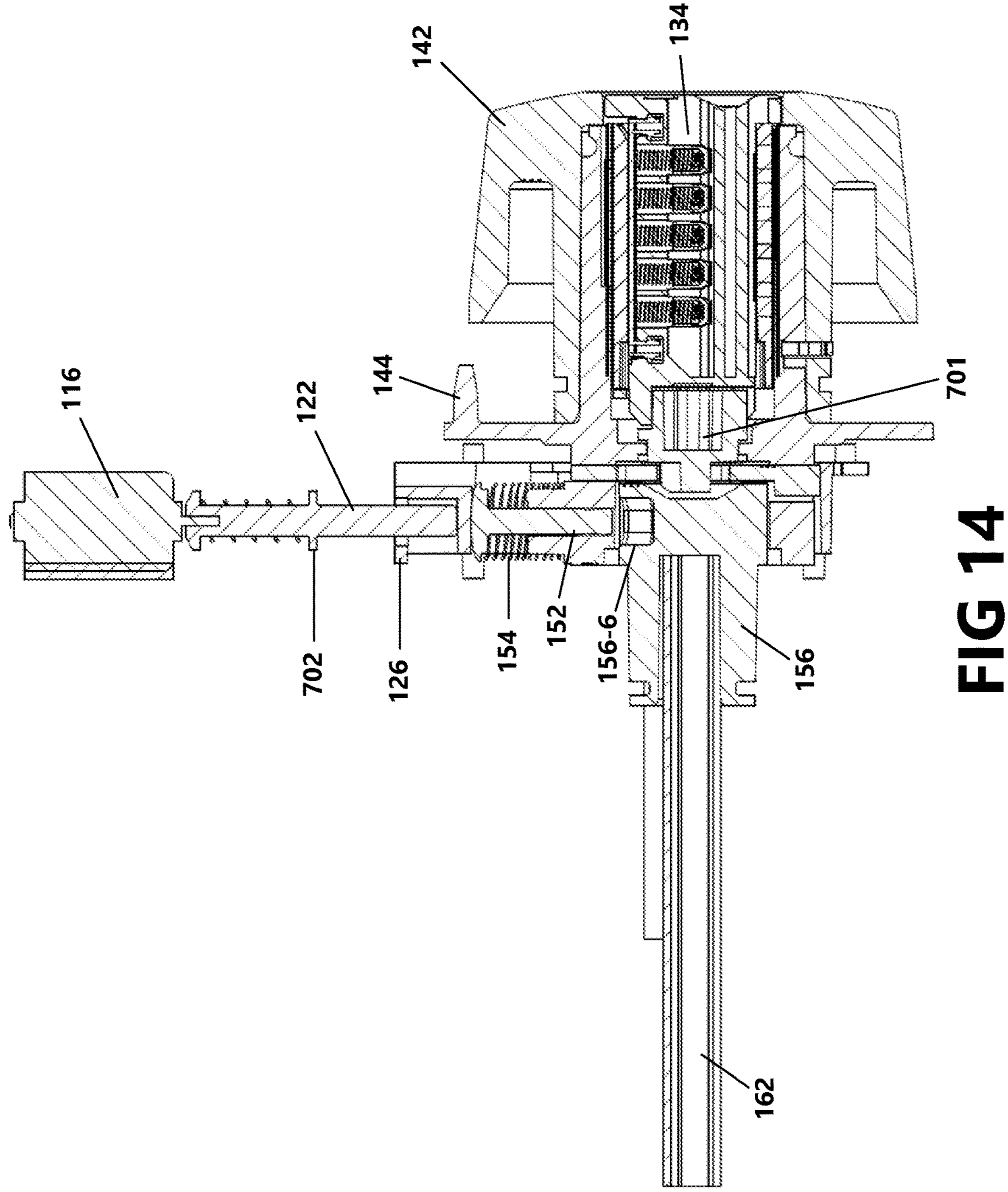
FIG. 14 illustrates a side cross-sectional view of the bezel assembly, the mechanical lock assembly, the motor, the engagement mechanism, and the coupling mechanism of the example electronic lock, wherein the electronic lock is in an unengaged state.
Figure 15:
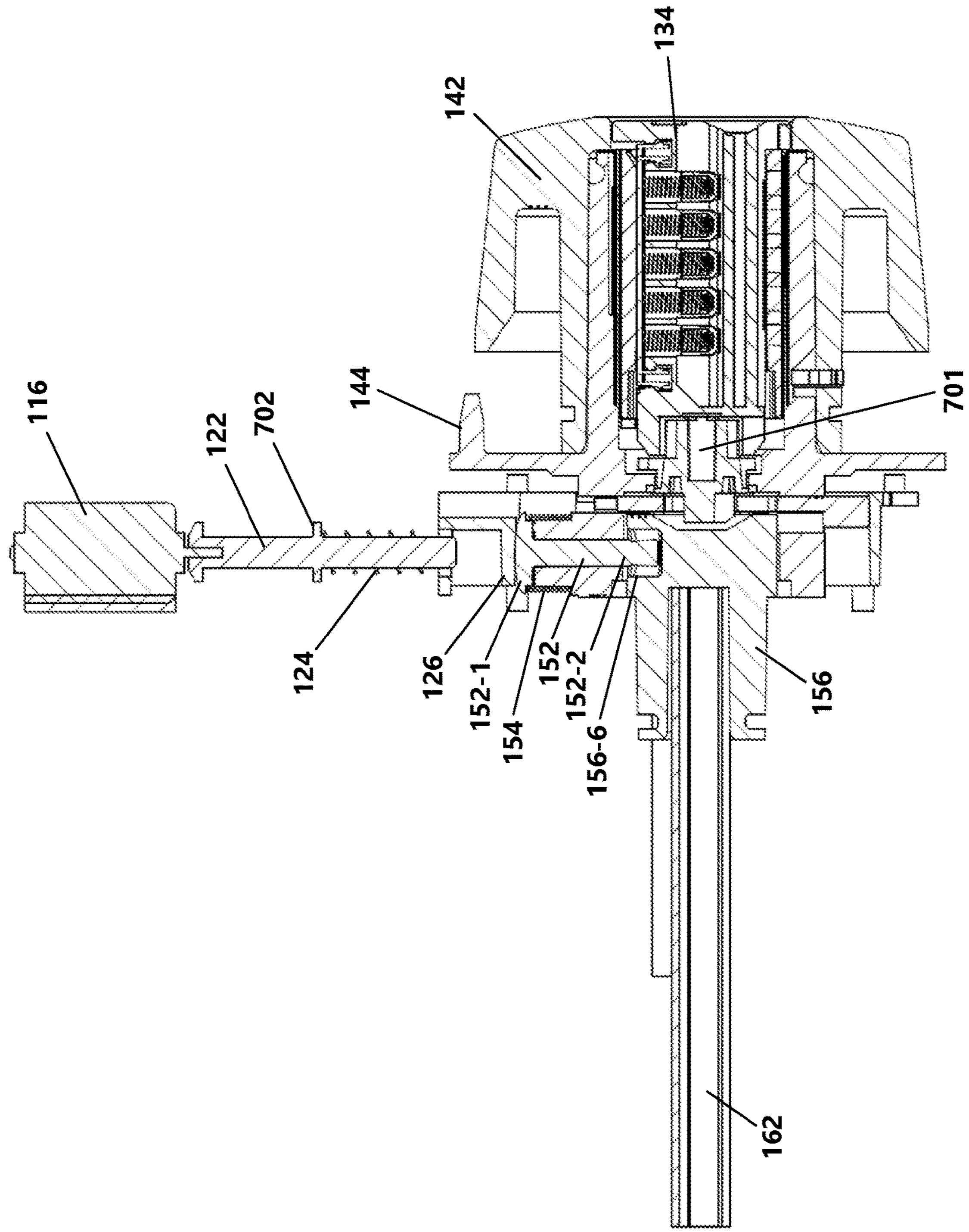
FIG. 15 illustrates a side cross-sectional view of the bezel assembly, the mechanical lock assembly, the motor, the engagement mechanism, and the coupling mechanism of the example electronic lock, wherein the electronic lock is in an engaged state.
Figure 16B:
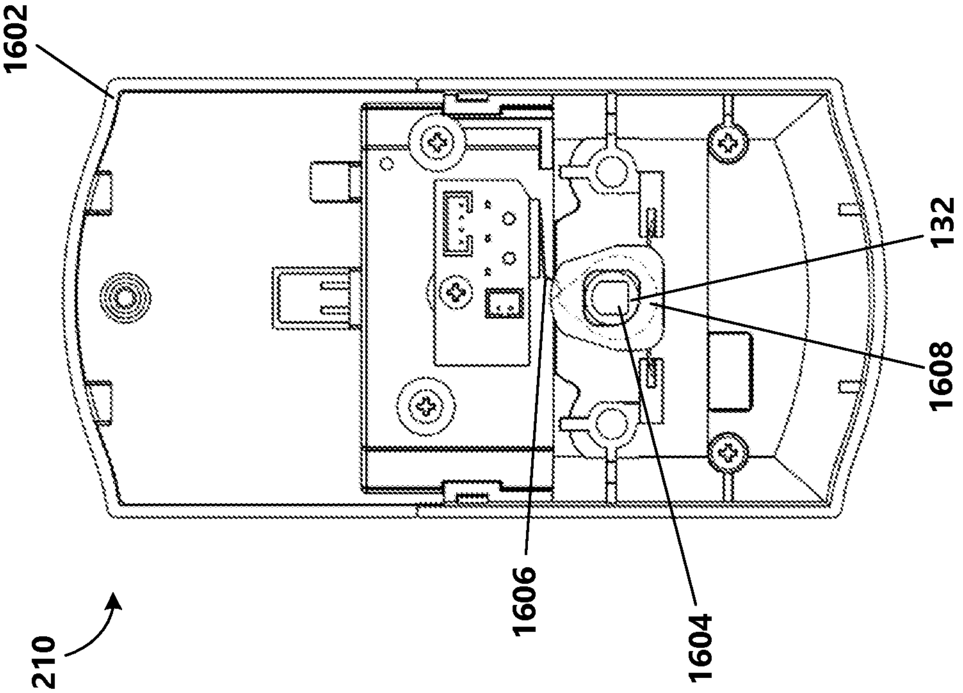
FIG. 16B illustrates a rear view of the interior assembly of the example electronic lock without a cover, wherein the lock is in an unlocked state.
Figure 17B:
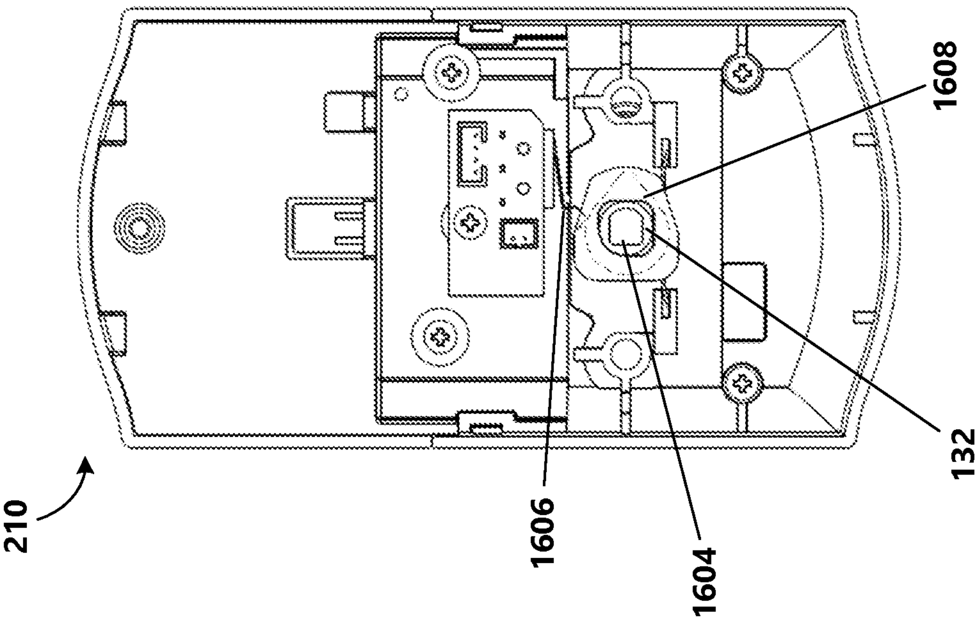
FIG. 17B illustrates a rear view of the interior assembly of the example electronic lock without a cover, wherein the lock is in a locked state.

The mechanical actuating mechanism 130 includes, in the embodiment shown, a bezel assembly 140 and a lock cylinder 134 that are configured to be located on the exterior side 208 of the door 202, and a mechanical turn piece 132 that is configured to be located on the interior side 206 of the door 202. As best shown in FIGS. 13-15, the lock cylinder 134 is operatively attached to one end of the torque blade 162; and as best shown in FIGS. 16B and 17B, a rear side of the interior turn piece 132 has a recess 1604 that is dimensioned to receive the other end of the torque blade 162. The interior turn piece 132 is continuously drivably connected to the latch assembly 160 via the torque blade 162. As such, in normal operation, a rotation of the interior turn piece 132 effects a rotation of the torque blade 162 to operate the latch bolt 166.

Figure 6A:
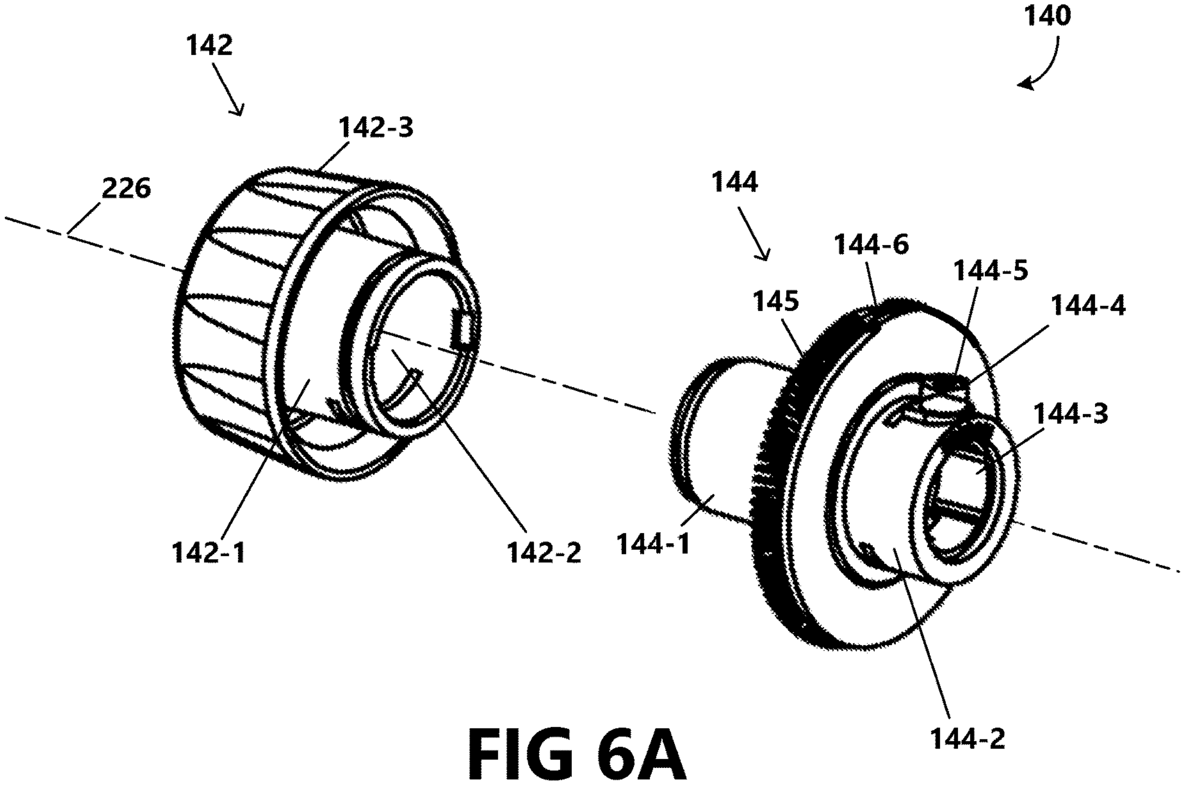
FIG. 6A illustrates an exploded perspective view of the bezel assembly of the example electronic lock.
Figure 6B:
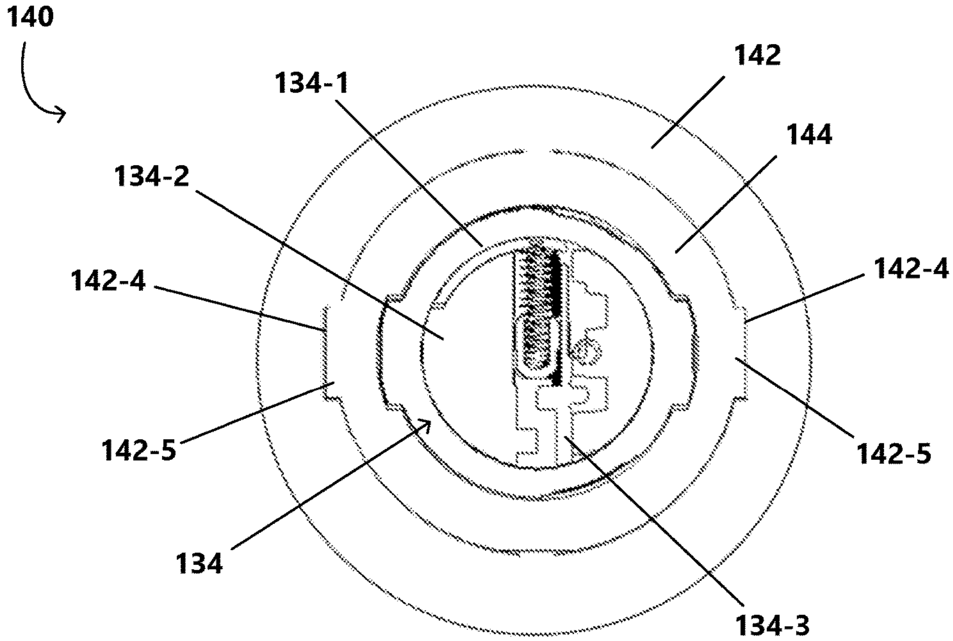
FIG. 6B illustrates a section view of the bezel assembly of the example electronic lock.

The lock cylinder 134 is shown in FIGS. 2B, 5, 6B, 7A, 7B, 8A, 9, and 13-15. As best shown in FIG. 6B, the lock cylinder 134 includes a cylinder housing 134-1 in which a cylinder plug 134-2 is housed. As best shown in FIG. 5, a first end of the cylinder plug 134-2 has a keyway 134-3 to allow a mechanical key 502 to enter the plug 134-2. When the key is rotated, the cylinder plug 134-2 rotates to turn a driver 701. The driver 701 activates a cam 740 (shown in FIGS. 7A and 7B), which is inserted into the sleeve. When a key is rotated 90 degrees, the cam 740 pushes down on a flange 126. The flange 126 pushes a pin 152 down and collapses an actuator spring 154. At the end of key rotation, the pin 152 is fully engaged in a slot of a coupling 156, thereby allowing operation of the bolt 116. As such, in normal operation, a rotation of a valid mechanical key 502 engages the pin 152 with the coupling 156, allowing a user to rotate a bezel 142 and the cylinder plug 134-2, which effects a rotation of the torque blade 162 to operate the latch bolt 166.

In example embodiments, the cylinder plug 134-2 may be a rekeyable cylinder plug, such as is described in U.S. Patent Publication No. 20200040605, entitled "Rekeyable Lock with Small Increments", or U.S. Pat. No. 10,612,271, entitled "Rekeyable Lock Cylinder With Enhanced Torque Resistance", the disclosures of which are hereby incorporated by reference in their entireties.

In some examples, the lock cylinder 134 may be used in combination with another authentication factor (e.g., a passcode, a biometric input, a wireless signal), or alternatively, may be used instead of entering another authentication factor. As shown in FIGS. 2B, 5, 8A, 9, and 13, a first end of the first end of the cylinder plug 134-2 including the keyway 134-3 is exposed to the exterior through an opening in the bezel assembly 140.

The bezel assembly 140, which is best shown in FIGS. 6A and 6B, is selectively drivably coupled to the latch assembly 160. The bezel assembly 140 includes a manually-operable bezel 142, which is shown in FIGS. 2B, 2C, 3, 5, 6A, 6B, 7A, 7B, 8A, 9, and 13-15, and a sleeve 144, which is shown in FIGS. 6A, 6B, 7A, 7B, and 9-15. With reference to FIG. 6A, the bezel 142 has a grip portion 142-3 and a body portion 142-1 comprising a longitudinal opening 142-2 within which the body portion 144-1 of the sleeve 144 is slidably received. The grip portion 142-3 is designed to be gripped by a user and to be rotated along a rotational axis 226.

The bezel 142 and the sleeve 144 are rotatably coupled and are configured to be rotatable around the rotational axis 226. The body portion 144-1 of the sleeve 144 is configured to house the lock cylinder 134. As is best seen in FIG. 6B, the inside perimeter of the body portion 142-1 of the bezel 142 includes one or more recesses 142-4, and the outside perimeter of the body portion 144-1 of the sleeve 144 includes one or more tabs 142-5 that extend radially outward. The one or more tabs 142-5 are designed to engage the one or more recesses 142-4 such that the bezel 142 and the sleeve 144 are rotatably coupled. Accordingly, when a rotational force is applied to the bezel 142, the sleeve 144 is engaged with and rotates the bezel 142.

In the example shown, a circumferentially-located spring 145 is positioned around a circumference of the sleeve 144, and is compressible via a tab 144-6 of the sleeve. Accordingly, when the bezel 142 is rotated alongside the sleeve 144, the spring 145 is compressed. When the bezel is released, the spring returns the bezel 142 and sleeve 144 to a "home" or starting/default position.

A coupling portion 144-2 of the sleeve 144 comprises a longitudinal opening 144-3, within which a portion of the coupling mechanism 150 is received, and a boss 144-4 that extends radially outward in a vertical direction from a side wall of the coupling portion 144-2 of the sleeve 144. The boss 144-4 comprises a longitudinal bore 144-5 that receives at least a portion of a coupling member (e.g., a pin 152 described below) in a radial direction relative to the rotational axis 226.

The torque blade 162 is configured to be selectively manually driven by a rotation of the bezel assembly 140. For example, when the lock 100 is in an engaged state, the bezel assembly 140 is drivably coupled to the torque blade 162 via the engagement mechanism 120 and the coupling mechanism 150, and a rotation of the manually-operable bezel 142 effects a rotation of the torque blade 162 to operate the latch bolt 166. A second end of the torque blade 162 is configured to extend through and be drivably received in an opening 156-5 defined in a coupling 156 (included in the coupling mechanism 150 described below) that corresponds to the shape of the cross-section shape of the torque blade 162. As will be described below, the coupling 156 can be selectively engaged with the bezel assembly 140, such that rotation of the bezel assembly 140 causes the coupling 156 to rotate, and thus drives rotation of the torque blade 162.

Alternatively, when the lock 100 is in an unengaged state, the bezel assembly 140 is drivably decoupled from the torque blade 162, and therefore the manually-operable bezel 142 is incapable of rotating the torque blade 162 to operate the latch bolt 166. In example embodiments, the manually-operable bezel 142 is free-spinning when rotated and decoupled from the torque blade 162; in alternative embodiments, the manually-operable bezel 142 may be freely rotatable within a particular range of rotation angles, or biased toward a predetermined position in which the coupling 156 is engageable by the bezel assembly 140 (e.g., a default position, such as the position seen in FIG. 10.

Accordingly, the torque blade 162 can be manually rotated when the turn piece 132 located on the interior side 206 of the door 202 is manually turned, when a valid mechanical key 502 is inserted into and turned within the lock cylinder 134, or when the lock 100 is placed in an engaged state and the exterior bezel assembly 140 is manually rotated. According to an aspect, the engagement state (i.e., engaged state versus disengaged state) of the lock 100 is electronically controlled via the electronic actuating mechanism 110.

The electronic actuating mechanism 110 includes a credential input mechanism 112, a control circuit 114, and a motor 116. An example credential input mechanism 112 is shown in FIGS. 2B, 3, 5, 7A, and 7B. The credential input mechanism 112 is located on the exterior side 208 of the door 202 and is configured to receive and communicate an electronic credential (e.g., a passcode or security token entered via a keypad (as shown), a biometric input received via a biometric sensor (not shown), a wireless signal received via a wireless interface (not shown), or other electronic credential) to the control circuit 114 for authentication of a user.

In some examples and as shown, the credential input mechanism 112 can be embodied as a keypad comprising a plurality of buttons 228, which may be used to enter a predetermined passcode for electronically effecting an engaged state or otherwise controlling operation of the lock 100. The keypad can be any of a variety of different types of keypads (e.g., a numeric keypad, an alpha keypad, an alphanumeric keypad). The buttons 228 may have one or more characters displayed thereon. In some examples, the buttons 228 may be physical buttons that extend through an exterior faceplate, shown as deadbolt rose 230 (as illustrated). In other examples, the keypad may have a plurality of touch areas that use touch to function as buttons 228. For example, the keypad may use a capacitive touch circuit. In the example shown, there are eleven touch areas or buttons 228; however, one skilled in the art should appreciate that in other examples there could be additional or fewer buttons 228.

In some embodiments, the exterior assembly 212 includes a single-touch actuator 232 that can be used to place the lock 100 in an engaged state. For example, when a user selects the single-touch actuator 232, the actuating mechanism included in the exterior assembly 212 rotatably couples the bezel assembly 140 to the torque blade 162 to enable rotation of the bezel assembly 140 to drive rotation of the torque blade 162 to extend or retract the latch bolt 166. In some examples, the single-touch actuator 232 is a button 228. In some examples, the single-touch actuator 232 is a button 228 comprising a particular marking, such as a logo, an icon, one or more characters, etc.

In alternative embodiments, one or more other types of user interface devices can be incorporated into the lock 100. For example, in example implementations, the exterior assembly 212 can include a biometric interface (e.g., a fingerprint sensor, retina scanner, or camera including facial recognition) by which biometric input can be used; an audio interface by which voice recognition can be used; or a wireless interface by which wireless signals can be used to actuate the engagement mechanism 120. According to another embodiment, a keypad may not present. In some examples, a user may use a Bluetooth® or Wi-Fi-®-enabled device that transmits signals that may allow the motor to actuate when the device is paired with the lock 100. In other examples, a user may use an RFID tag that allows the motor to actuate when the correct RFID tag is detected. In further embodiments, alternative methods of electronically communicating with the motor are contemplated. When a user inputs a valid passcode or other electronic credential via the credential input mechanism 112 that is recognized by the control circuit 114, the electrical motor 116 is energized to actuate the engagement mechanism 120 to couple or decouple the bezel assembly 140 to/from the latch assembly 160 via the coupling mechanism 150.

The control circuit 114 comprises electronic circuitry for the electronic lock 100. In some examples, the control circuit 114 is a printed control circuit configured to receive the credential input of the credential input mechanism 112. When the control circuit 114 receives the correct input, the control circuit 114 sends a signal to the motor 116. The control circuit 114 is configured to execute a plurality of software instructions (i.e., firmware) that, when executed by the control circuit 114, cause the electronic lock 100 to implement methods and otherwise operate and have functionality as described herein. The control circuit 114 may comprise a device commonly referred to as a processor, e.g., a central processing unit (CPU), digital signal processor (DSP), or other similar device, and may be embodied as a standalone unit or as a device shared with components of the electronic lock 100. The control circuit 114 may include memory communicatively interfaced to the processor, for storing the software instructions. Alternatively, the electronic lock 100 may further comprise a separate memory device for storing the software instructions that is electrically connected to the control circuit 114 for the bi-directional communication of the instructions, data, and signals therebetween.

In example embodiments, the engagement mechanism 120 and coupling mechanism 150 may include an engagement means, such as is described in U.S. Patent Publication No. 2020/0040605, entitled "Locking Assembly with Spring Mechanism", the disclosure of which is hereby incorporated by reference in its entirety.

The engagement mechanism 120 includes an actuating spindle 122, a transmission spring 124, and a movable flange 126. As shown in FIGS. 7A, 7B, and 10-15, the motor 116 is operatively coupled to the actuating spindle 122 and is configured to rotate the actuating spindle 122 around a first axis. The actuating spindle 122 is a rod-shaped mechanism oriented around a first axis, for example, vertically within the lock 100. The actuating spindle 122 includes a recess 724 that is connected to the motor 116. The actuating spindle 122 includes a spring driving pin 702 that engages the transmission spring 124 such that, upon rotation of the actuating spindle 122, the transmission spring 124 moves upward or downward relative to the spring driving pin 702 along the first axis between a neutral position (as in FIG. 10) and a biasing position (as in FIG. 11). For example, the motor 116 can rotate the actuating spindle 122 in both a clockwise and a counterclockwise direction, wherein rotation in one direction causes the transmission spring 124 to move upward to the neutral position, and rotation in the other direction causes the transmission spring 124 to move downward along the actuating spindle 122, away from the motor 116 and toward the movable flange 126 to the biasing position. The movable flange 126 is operatively engageable by the transmission spring 124 at least when the transmission spring 124 is in the biasing position.

The coupling mechanism 150 includes a pin 152, an actuator spring 154, and a coupling 156. The flange 126 is movable between a first position and a second position. The flange 126 remains in the first position when the transmission spring 124 is in the neutral position (e.g., being biased upward by actuator spring 154 biasing against the pin 152), and the flange is biased toward the second position when the transmission spring 124 is in the biasing position, since the transmission spring 124 will generally be selected to have a compressive force that is greater than the resisting force of the actuator spring 154. Biasing the flange 126 toward the second position causes the coupling mechanism 150 to drivably couple the bezel assembly 140 to the latch assembly 160.

The pin 152, the actuator spring 154, and the coupling 156 are best shown in FIGS. 7A, 7B, 10, 11, 12, 13, 14, and 15. The pin 152 comprises a head 152-1 and a shaft 152-2 extending therefrom along the first axis. The actuator spring 154 extends around the shaft 152-2 of the pin 152. The coupling 156 comprises a cylindrical body 156-1 positioned along a second axis. For example, the first axis may be defined as vertical and the second axis, also referred to herein as the rotational axis, may be defined as horizontal. The actuator spring 154 is sandwiched between a bottom surface of the head 152-1 of the pin 152 and a top surface of the boss 144-4 included on the sleeve 144.

The pin 152 is aligned with the longitudinal bore 144-5 defined in the boss 144-4 of the sleeve 144, and at least a portion of the shaft 152-2 of the pin 152 is axially slidably received in the longitudinal bore 144-5. The pin 152 is movable between an unengaged position and an engaged position. The pin 152 remains in the unengaged position when the transmission spring 124 and the flange 126 are in the neutral position, and the pin 152 is biased toward the engaged position when the transmission spring 124 and the flange 126 are in the biasing position. For example, when the transmission spring 124 and the flange 126 are in the neutral position, an inner circumferential portion 126-1 of the flange

126 rests atop the head 152-1 of the pin 152, and is not compressing the actuator spring 154. Accordingly, the actuator spring 154 is in a relaxed state, which maintains the pin 152 from being pushed downward and extending through the longitudinal bore 144-5 in the boss 144-4 included in the sleeve 144.

As best shown in FIGS. 7A and 7B, the cylindrical body 156-1 of the coupling 156 has a first portion 156-2 having a first diameter and a second portion 156-3 having a second diameter less than the first diameter. The cylindrical body 156-1 of the coupling 156 comprises a longitudinal opening 156-5 that is dimensioned to slidably receive the torque blade 162, such that the coupling 156 and the torque blade 162 are rotatably coupled. The first portion 156-2 of the cylindrical body of the coupling 156 is slidably received within the longitudinal opening 144-3 defined in the coupling portion 144-2 of the sleeve 144. When the lock 100 is in the unengaged state, the coupling 156 rotates independently from the sleeve 144.

The first portion 156-2 of the cylindrical body 156-1 of the coupling 156 defines at least one recess 156-6 (shown in FIGS. 7A, 7B, 10, 11, and 12) that extends radially inwardly from an outer surface of the first portion 156-2 of the cylindrical body 156-1 toward the longitudinal opening. At least one recess 156-6 is positioned to be alignable along the first axis with the longitudinal bore 144-5, the actuator spring 154, and the pin 152. When the transmission spring 124 is in the neutral position (shown in FIG. 10), the flange 126 remains in the neutral position as well, and the pin 152 remains outside of a plurality of recesses 156-6 (shown as three recesses 156-6*a-c* positioned at 90 degree angles from each other) within the coupling 156. In this position, the coupling 156 and associated pin 152 may be rotated within the perimeter of the flange 126. Each of the plurality of recesses 156-6 forms a nest which is sized to selectively receive a bottom portion of the shaft of the pin 152 in a radial direction in relation to the cylindrical body 156-1 of the coupling 156.

Figure 11:
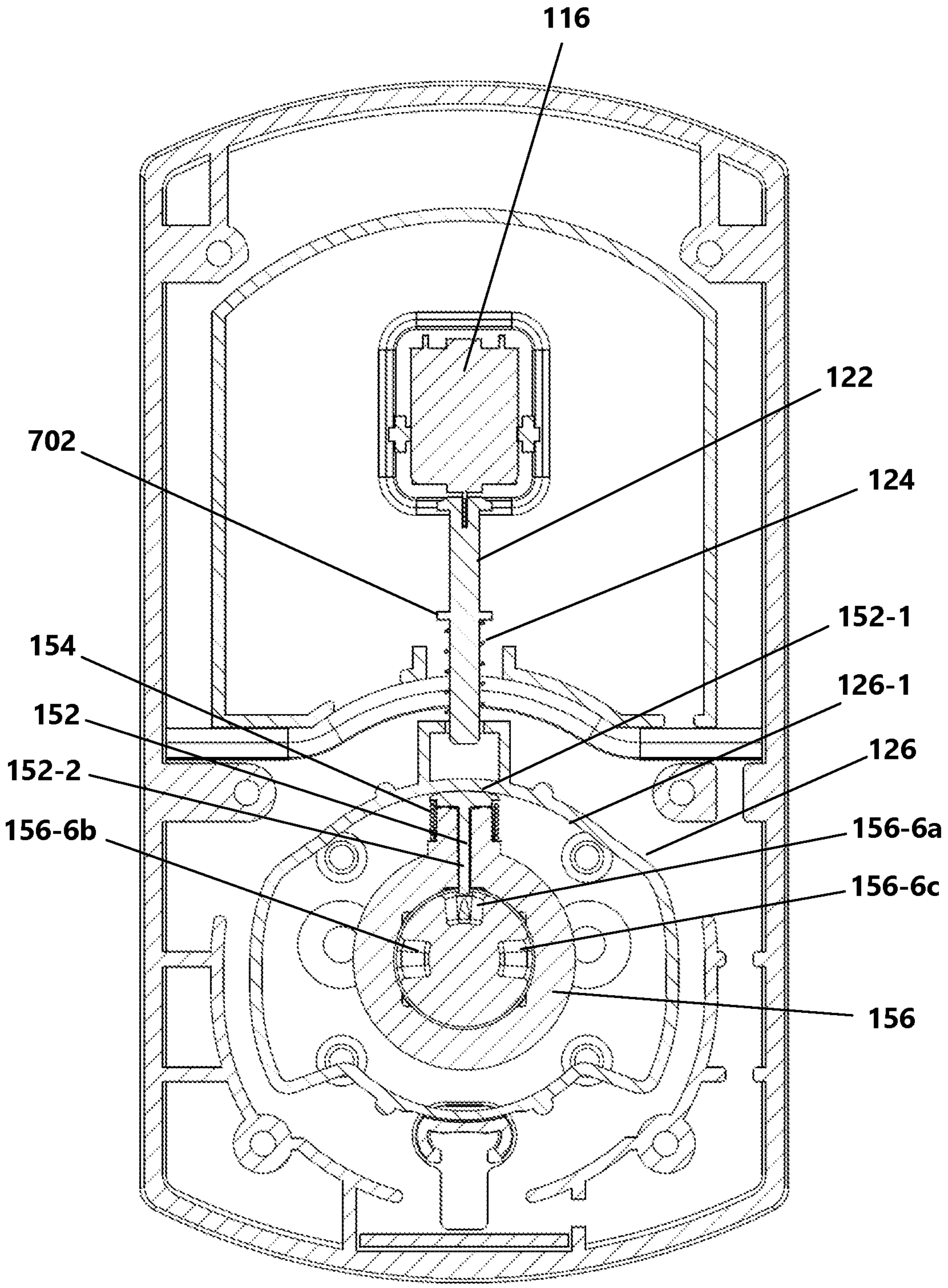
FIG. 11 illustrates a rear view of the internal mechanisms of the example electronic lock in an engaged state.
Figure 12:
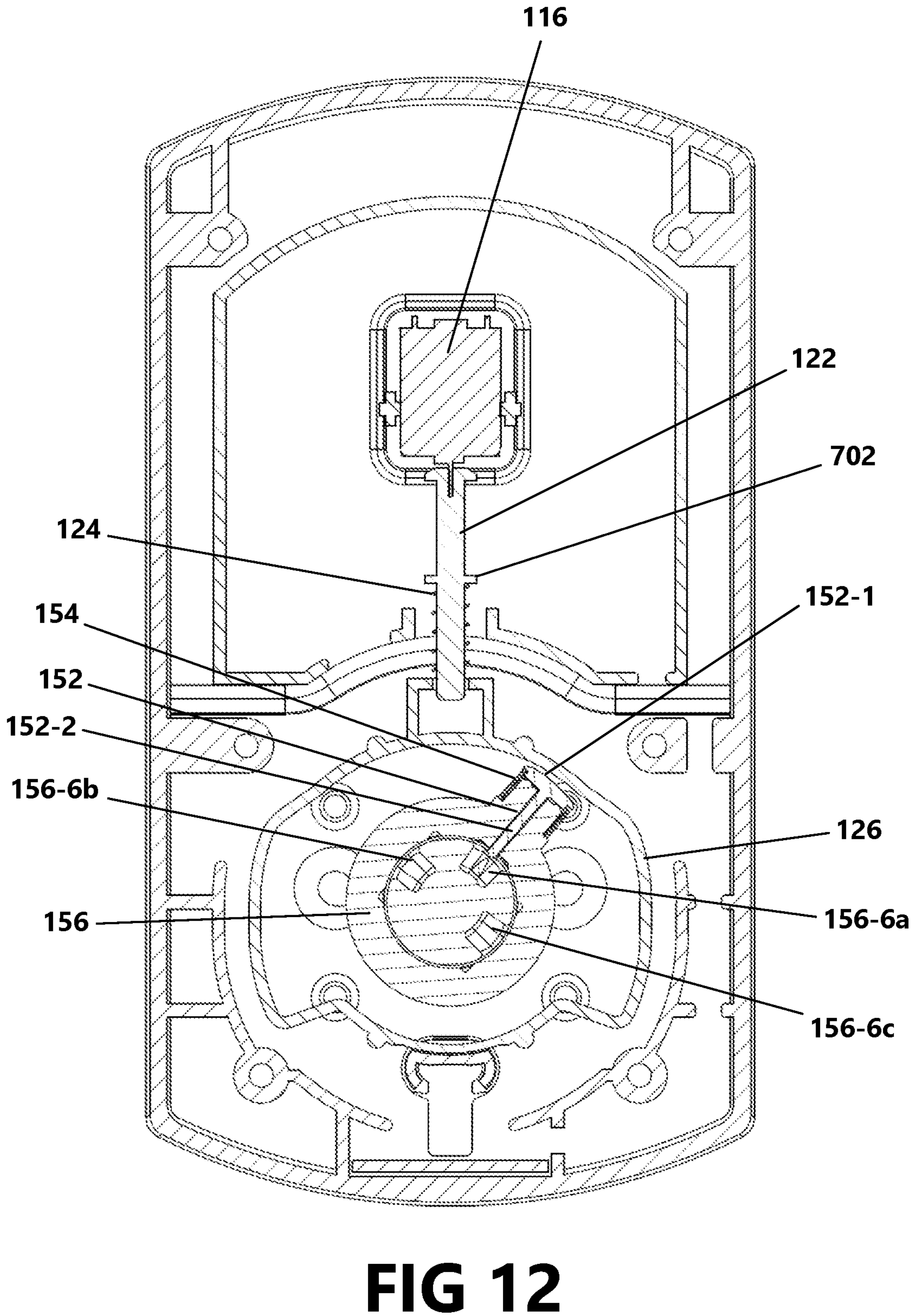
FIG. 12 illustrates a rear view of the internal mechanisms of the example electronic lock in an engaged state and the bezel assembly rotated.

As shown in FIGS. 11, 12, and 15, when the transmission spring 124 biases the flange 126 downwards toward the second position, the flange 126 biases the actuator spring 154 into a compressed state if and when the pin 152 is aligned with one of the recesses 156-6. This results in pushing the pin 152 downward from the unengaged position to an engaged position. In the engaged position, the pin 152 is biased downward such that, when aligned with a recess 156-6 in the coupling, it resides within the sleeve 144 and the coupling 156. For example, the head 152-1 of the pin 152 is received in the longitudinal bore 144-5 formed in the boss 144-4 included in the sleeve 144, and a bottom portion of the shaft 152-2 of the pin 152 extends through the longitudinal bore 144-5 and is received in the at least one recess 156-6 defined in the cylindrical body 156-1 of the coupling 156. Thus, when the pin 152 is in the engaged position, the sleeve 144, which is rotatably coupled with the bezel 142, is rotatably coupled with the coupling 156. The coupling 156 is rotatably coupled with the torque blade 162, which is drivably received in the spindle passage 204 of the latch spindle 164. Accordingly, when the pin 152 is in the engaged position, the lock 100 is placed in an engaged state where a manual rotation of the bezel assembly 140 drives rotation of the torque blade 162 to extend or retract the latch bolt 166 into an unlocked or locked position. According to an aspect, when the lock 100 is in an engaged state, the retraction and extension of the latch bolt 166 is not driven by the motor 116, but can be driven by the manual rotation of the bezel assembly 140. Advantageously, battery life can be extended due to the bolt action being manually driven by a user, rather than electrically driven by a battery. Additionally, the manually-driven bolt action may provide ample force to retract and/or extend the latch bolt 166 through a misaligned strike plate 220, such as may be the case when a warped door condition is experienced. Accordingly, the warped door condition may be overcome, and without requiring battery power to electrically drive the latch bolt 166.

As best shown in FIGS. 2B, 5, 7A, and 7B, the external assembly 212 includes the deadbolt rose 230. The deadbolt rose 230 is shown to have a decorative rectangular shape; however, round, square, or other shapes for the deadbolt rose 230 are possible and are within the scope of the present disclosure. As best shown in FIGS. 7A and 7B, the deadbolt rose 230 may define a plurality of holes 708 to receive the buttons 228 of the credential input mechanism 112 embodied as a keypad. The keypad may be made from a variety of materials that are waterproof, such as plastics, rubber, or other similar materials. Further, the connection between the holes 708 of the deadbolt rose 230 and the buttons 228 may comprise a seal to prevent water from penetrating the internal components of the lock 100. As described above, in alternative embodiments, the credential input mechanism 112 may be a biometric interface (e.g., a fingerprint sensor, retina scanner, or camera including facial recognition) by which biometric input can be used, an audio interface by which voice recognition can be used, or a wireless interface by which wireless signals can be used to actuate the engagement mechanism 120. The buttons 228 may extend from the control circuit 114 that transmits electrical signals based on user actuation of the credential input mechanism 112 to a controller in the exterior assembly 112 using a wiring harness (not shown). In this example, a plurality of fasteners 710 secure a back plate 712 and the control circuit 114 to the deadbolt rose 230. As shown, holes in the back plate 712 are aligned with holes in a plate guide 738 as well as a control circuit housing 714, and the control circuit 114, and the fasteners 710 extend therethrough into receptacles in the deadbolt rose 230. The control circuit housing 714 may rest flush against the back plate 712, which may rest flush against the door 202 with supports 716 extending into holes 718 defined in the adaptor 402 and further into holes 234 defined in the latch assembly 160 (shown in FIG. 2C). The adaptor 402 is designed to fit in the bore 214 formed in the door 202. The back plate 712 defines an opening 720 that is aligned with an opening 722 in the adaptor 402, so that second portion 156-3 of the cylindrical body 156-1 of the coupling 156 housing the second end of the torque blade 162 can extend therethrough.

As shown, a collar 706 extends from the deadbolt rose 230. In the example shown, the collar 706 is formed integral with the deadbolt rose 230, but can be a separate component. The collar 706 defines an opening 704 through which the body portion 142-1 of the bezel 142 extends. The outer grip portion 142-3 of the bezel 142 has a diameter that is greater than a diameter of the body portion 142-1 and is located external to the deadbolt rose 230. A locking tab 732 is configured to engage a first slot 726 formed in a sidewall of the collar 706, and a second slot 728 formed in the body portion 142-1 of the bezel 142, so as to connect the bezel assembly 140 to the deadbolt rose 230.

Figure 8B:
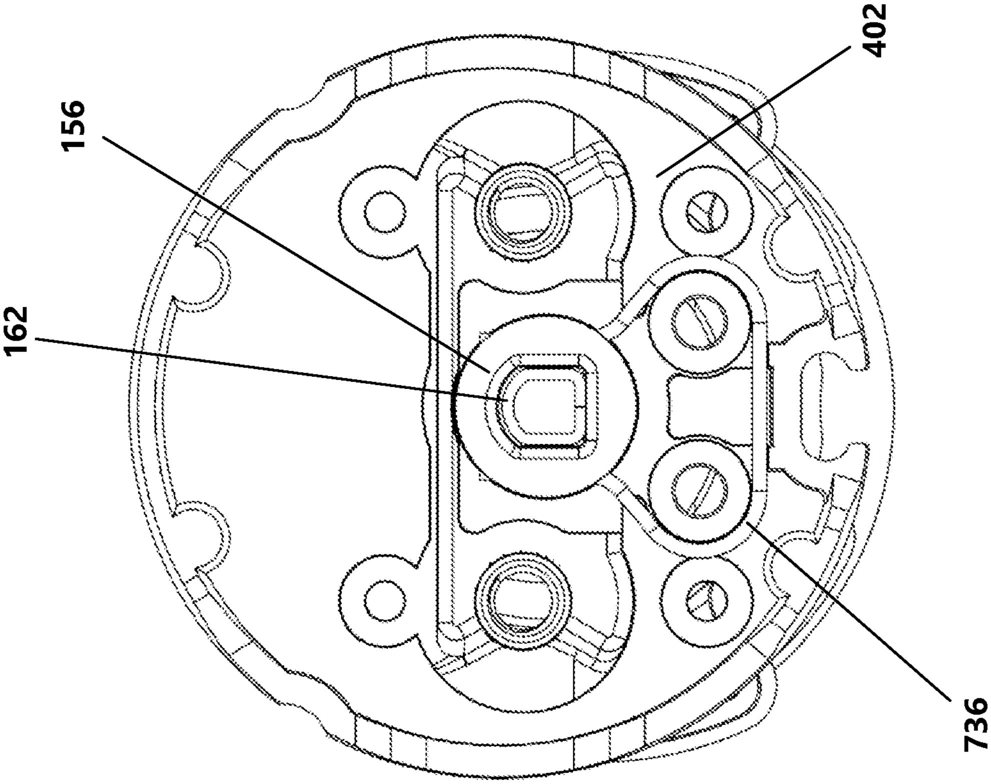
FIG. 8B illustrates a rear view of the bezel assembly of FIG. 8A, wherein the bezel assembly is operatively connected to an adaptor.
Figure 8A:
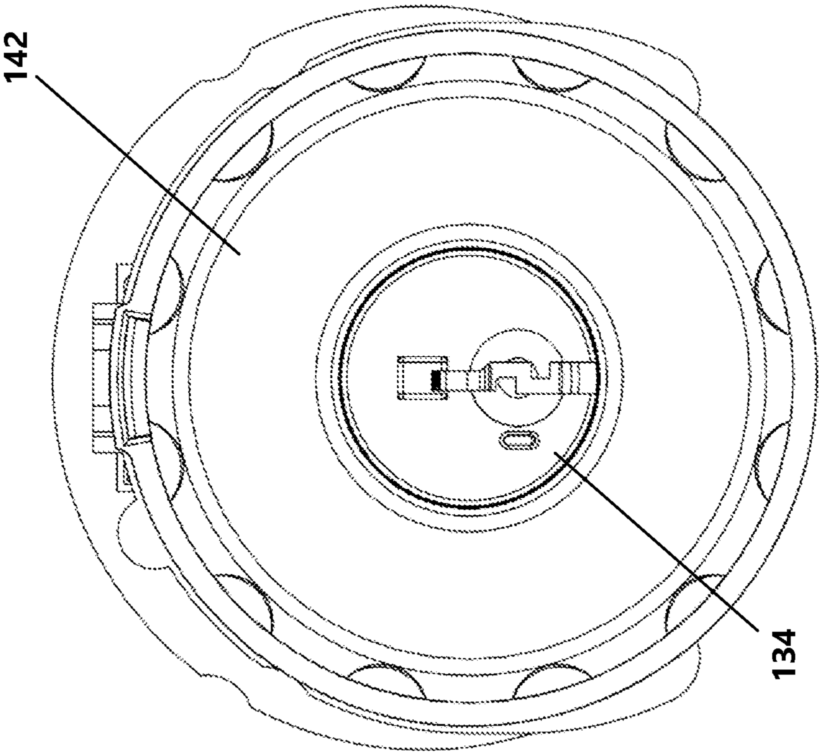
FIG. 8A illustrates a front view of the bezel assembly and a mechanical lock assembly of the example electronic lock.

A first clip 734 is shown. The first clip 734 aids in retaining the lock cylinder 134 within the bezel assembly 140. Optionally, the cylinder plug 134-2 can be replaceable by removal of the first clip 734, replacement of the cylinder plug 134-2, and re-insertion of the first clip 734 through slot 730. The lock cylinder 134 and the bezel assembly 140 are rotatably coupled as described above. A second clip 736 is also shown. As best shown in FIG. 8B, the second clip 736 retains the coupling 156 and prevents rotation of the coupling when not engaged by the pin 152.

As best shown in FIGS. 2A, 2C, 4, and 16A-17B, the interior assembly 210 includes an interior faceplate 1602 that defines a recessed area for housing internal components of the interior assembly 210. The interior faceplate 1602 is shown to have a decorative rectangular shape; however, round, square, or other shapes for the interior faceplate 1602 are possible and are within the scope of the present disclosure.

Figure 16A:
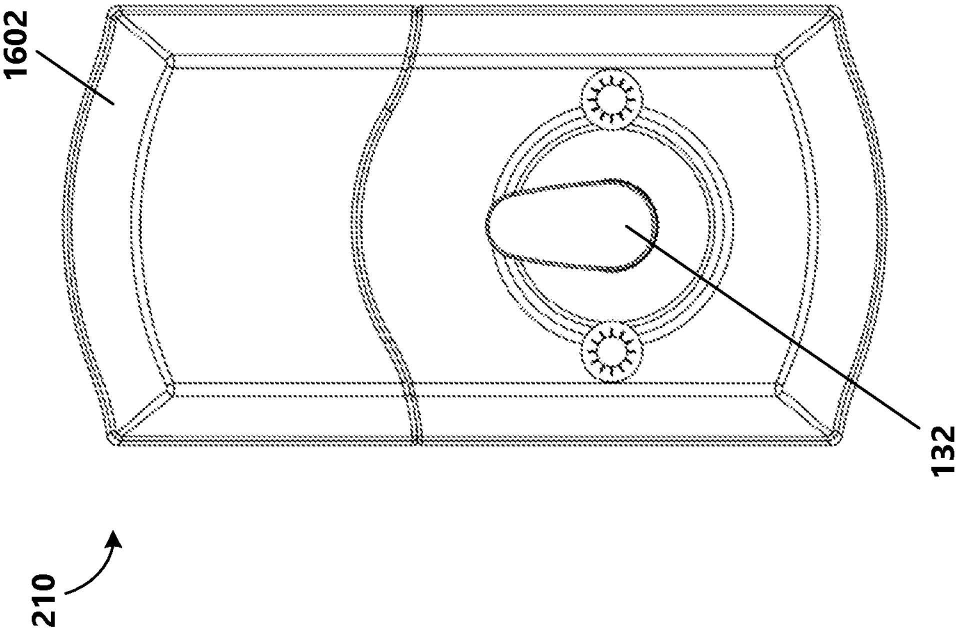
FIG. 16A illustrates a front view of the interior assembly of the example electronic lock, wherein the lock is in an unlocked state.

With reference to FIGS. 16A and 16B, the lock 100 is shown in an unlocked state, wherein the latch bolt 166 is retracted and in the unlocked position. The turn piece 132 is rotatably coupled to the torque blade 162 such that when the latch bolt 166 is in the unlocked position, the turn piece 132 is rotated to an unlocked position. As shown, in the unlocked state, the turn piece 132 is in the unlocked position where the turn piece 132 is rotated such that it extends in a vertical direction. The turn piece 132 includes a teardrop washer 1608 that engages a switch 1606 communicatively coupled to the control circuit 114 via an electrical connection. Upon rotation of the turn piece 132 in the unlocked position, the teardrop washer 1608 biases the switch 1606 upward to a disengaged position. According to an aspect, when the lock 100 is in an unlocked state and the turn piece 132 and teardrop washer 1608 are rotated in the unlocked position, the switch 1606 is biased in the disengaged position, which signals to the control circuit 114 that the latch bolt 166 is not thrown and is in the unlocked position. As described above, the exterior assembly 212 includes a single-touch actuator 232 that can be used to place the lock 100 in an engaged state. According to an aspect, the single-touch actuator 232 is electronically actuable when the latch bolt 166 is not thrown and in the unlocked position based on the position of the switch 1606. For example, when the switch 1606 is in the disengaged position as shown in FIG. 16B, the control circuit 114 is informed that the latch bolt 166 is not thrown and in the unlocked position. Accordingly, when the single-touch actuator 232 is selected by a user, the control circuit 114 sends a signal to the motor 116 and energizes the electrical motor 116 to actuate the engagement mechanism 120 to rotatably couple the bezel assembly 140 to the torque blade 162 to enable rotation of the bezel assembly 140 to drive rotation of the torque blade 162 to extend the latch bolt 166 to the locked position.

Figure 17A:
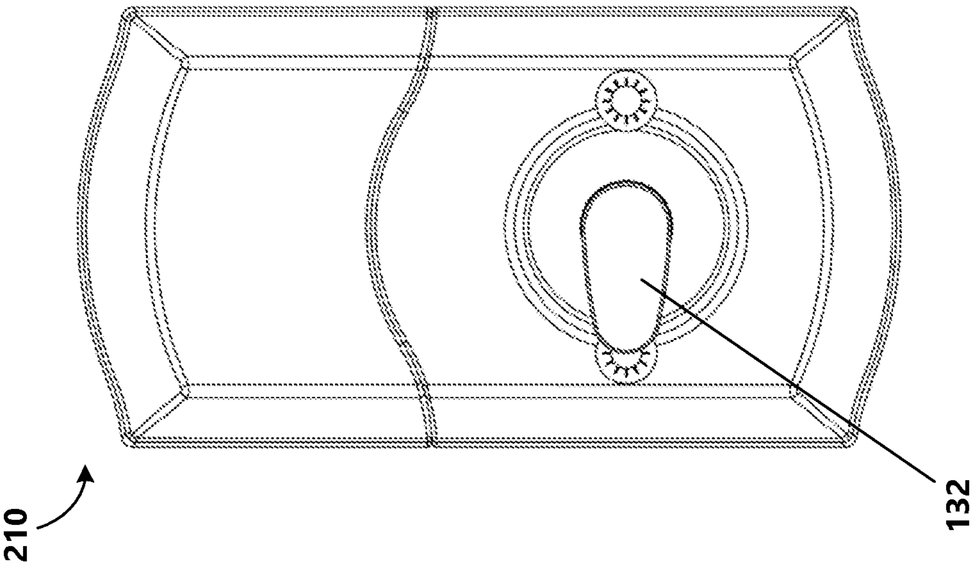
FIG. 17A illustrates a front view of the interior assembly of the example electronic lock, wherein the lock is in a locked state.

With reference to FIGS. 17A and 17B, the lock 100 is shown in a locked state, where the turn piece 132 and teardrop washer 1608 are rotated in a locked position. In the locked position, the turn piece 132 extends in a horizontal direction and the teardrop washer 1608 is rotated such that the teardrop point also extends in the horizontal direction. In the locked position, the teardrop washer 1608 is dimensioned to allow the switch 1606 to bias downward to an engaged position, which signals to the control circuit 114 that the latch bolt 166 is thrown and is in the locked position. According to an aspect, the single-touch actuator 232 (seen in FIG. 5) is not electronically actuable when the latch bolt 166 is thrown and in the locked position. Accordingly, based on the engaged position of the switch 1606 when the latch bolt 166 is in the locked position, if the touch actuator 232 is selected by a user, the motor 116 is not energized and does not actuate the engagement mechanism 120 to rotatably couple the bezel assembly 140 to the torque blade 162. Thus, to retract the latch bolt 166 to an unlocked position from the exterior side of the door 202, the user may either use a valid mechanical key 502 in the lock cylinder 134 or may input a valid credential using the credential input mechanism 112 to couple the bezel assembly 140 to the latch assembly 160 and then rotate the bezel 142 to operate the latch bolt 166.

Figure 18:
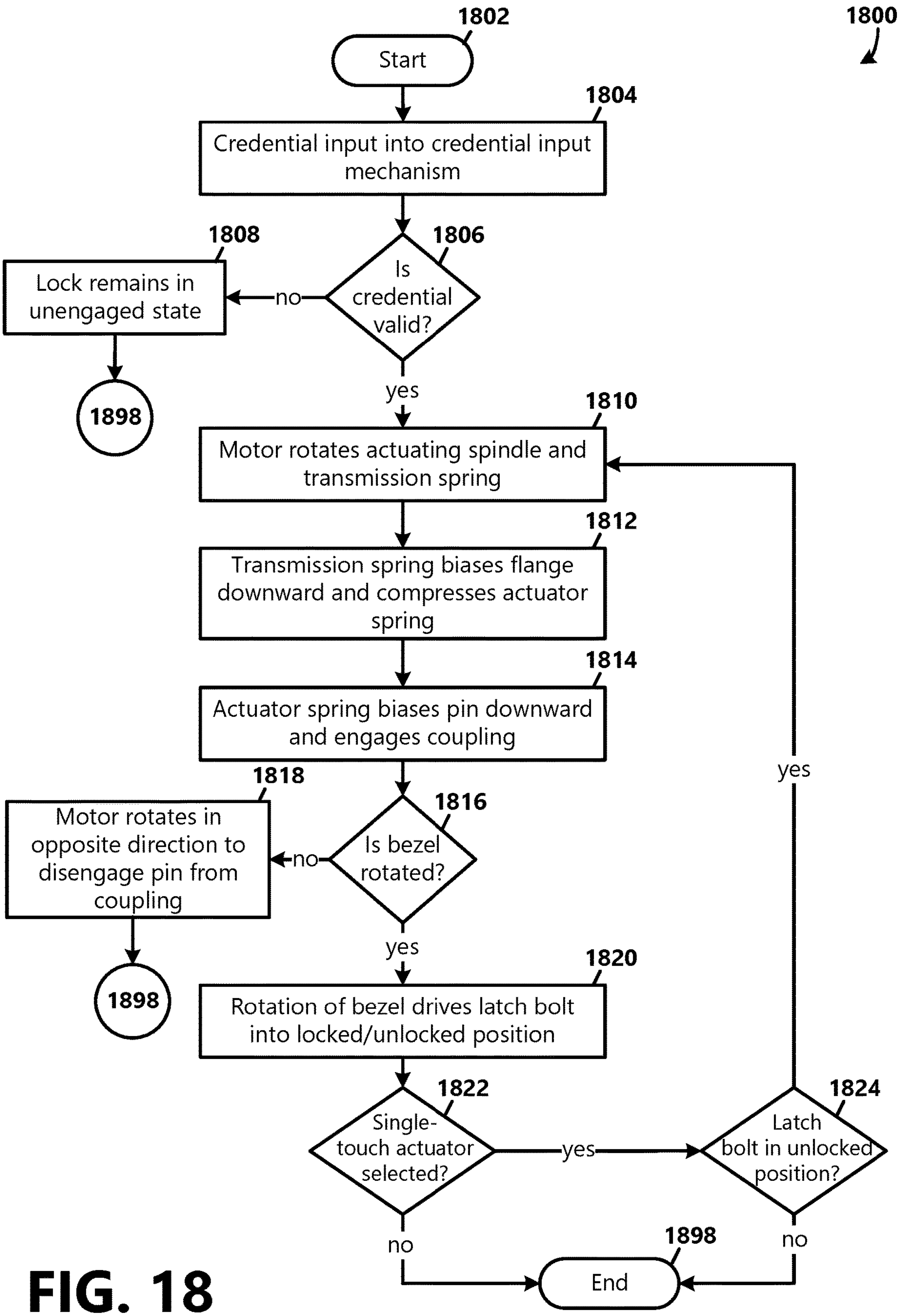
FIG. 18 illustrates a flowchart of a method of how the example electronic lock can be used to lock and unlock a door.

FIG. 18 illustrates an example flowchart of a method 1800 for using the electronically-controlled, manually-actuated deadbolt lock 100 to lock and unlock the door 202. The method 1800 starts at OPERATION 1802 and proceeds to OPERATION 1804 where one or a combination of electronic credentials are received via the credential input mechanism 112. For example, the electronic credential may be a passcode or security token entered via a keypad by a user, a user biometric input received via a biometric sensor, a wireless signal received via a wireless interface, or other electronic credential that may be verified by the control circuit 114 for authentication of a user.

At DECISION OPERATION 1806, a determination may be made as to whether the received credential is valid. For example, the control circuit 114 is coupled in electrical communication with the credential input mechanism 112, and is configured with control logic to discriminate between a valid input credential and an invalid input credential input/provided by a user, a user computing device, an RFID chip, an electronic key fob, etc., via the credential input mechanism 112. When a determination is made that an invalid input credential is received, the motor 116 does not actuate and the electronic lock 100 remains in an unengaged state at OPERATION 1808, where the bezel assembly 140 is drivably decoupled from the torque blade 162, and the manually-operable bezel 142 is incapable of rotating the torque blade 162 to operate the latch bolt 166. When a determination is made that a valid input credential is received, the method 1800 proceeds to OPERATION 1810.

At OPERATION 1810, the control circuit 114 provides a signal to the motor 116, which actuates the motor 116 to rotate the actuating spindle 122. As described above, rotation of the actuating spindle 122 causes the transmission spring 124 to move downward along the actuating spindle 122 away from the motor 116 and toward the movable flange 126 to the biasing position. At OPERATION 1812, the transmission spring 124 engages and biases the flange 126 downward, which compresses the actuator spring 154, and at OPERATION 1814, the pin 152 is pushed downward by the actuator spring 154 to the engaged position. In the engaged position, the pin 152 resides within the sleeve 144 and the coupling 156, and the lock 100 is in an engaged state. Accordingly, the bezel 142, which is rotatably coupled with the sleeve 144, is drivably coupled to the latch assembly 160, which allows for manual rotation of the bezel 142 to retract or extend the latch bolt 166.

At DECISION OPERATION 1816, if the bezel 142 is not rotated within a predetermined period of time (e.g., 10 seconds, 15 seconds, or other period of time), at OPERATION 1818, the motor 116 may automatically rotate the actuating spindle 122 in an opposite direction, which causes the transmission spring 124 to move upward to the neutral position, which disengages the pin 152 from the coupling 156 and places the lock 100 in a disengaged state. If the bezel 142 is rotated within the predetermined period of time, at OPERATION 1820, rotation of the bezel 142 rotates the torque blade 162, which drives the latch spindle 164 to extend or retract the latch bolt 166 into an unlocked or locked position. Advantageously, battery life can be extended due to the bolt action being manually driven by a user, rather than electrically driven by the battery. Additionally, the manually-driven bolt action may provide ample force to retract and/or extend the latch bolt 166 through a misaligned strike plate 220, such as may be the case when a warped door condition is experienced. Accordingly, the warped door condition may be overcome, and without requiring battery power to electrically drive the latch bolt 166.

At DECISION OPERATION 1822, a determination may be made as to whether the single-touch actuator 232 is selected by a user. If the single-touch actuator 232 is selected by a user, at DECISION OPERATION 1824, a determination may be made as to whether the latch bolt 166 is in an unlocked position based on a position of the switch 1606. For example, the switch 1606 in the unlocked position provides a signal to the control circuit 114 that the latch bolt 166 is not thrown and is in the unlocked position, which allows the single-touch actuator 232 to be electronically actuatable. When a determination is made that the latch bolt 166 is in an unlocked position, the method 1800 returns to OPERATION 1810, where the motor 116 is actuated to cause the engagement mechanism 120 to drivably couple the bezel assembly 140 to the latch assembly 160 for enabling rotation of the bezel 142 to extend the latch bolt 166 to a locked position. If the single-touch actuator 232 is not selected by a user, the method 1800 ends at OPERATION 1898.

Figure 19:
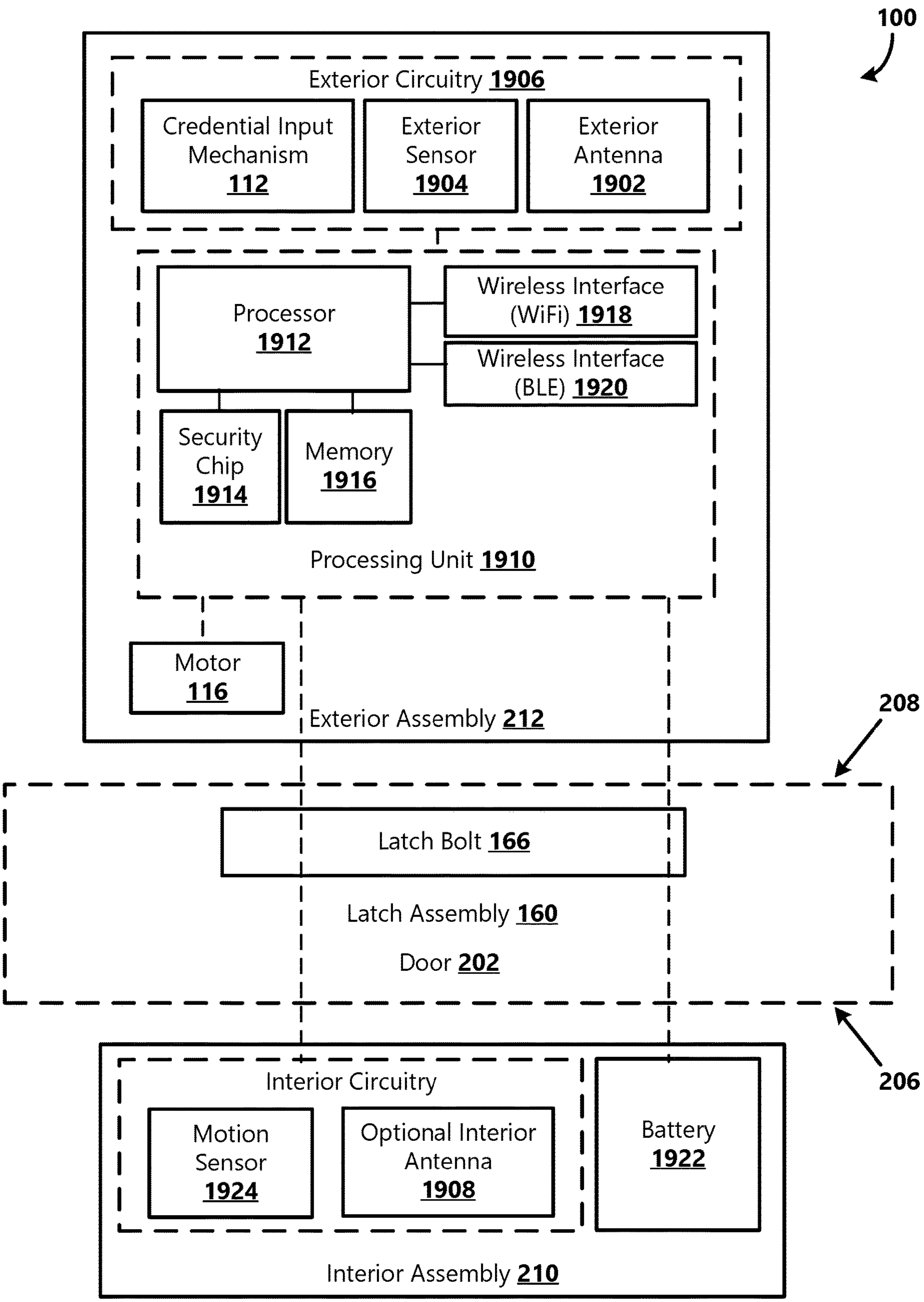
FIG. 19 illustrates a schematic representation of the electronic lock seen in the environment of FIG. 2A.

FIG. 19 is a schematic representation of the electronic lock 100 mounted to the door 202. The interior assembly 210, the exterior assembly 212, and the deadbolt latch assembly 160 are shown.

The exterior assembly 212 is shown to include various exterior circuitry 1906 including the credential input mechanism 112 and an optional exterior antenna 1902 usable for communication with a remote device. In addition, the exterior circuitry 1906 can include one or more sensors 1904, such as a camera, proximity sensor, or other mechanism by which conditions exterior to the door 202 can be sensed. In response to such sensed conditions, notifications may be sent by the electronic lock 100 to a server or a user's mobile device including information associated with a sensed event (e.g., time and description of the sensed event, or remote feed of sensor data obtained via the sensor).

The exterior antenna 1902 is capable of being used in conjunction with an interior antenna 1908, such that, for example, a processing unit 1910 can determine where a mobile device is located, wherein only a mobile device that is paired with the electronic lock 100 and determined to be located on the exterior of the door 202 is able to actuate the motor 116 to place the lock 100 in an engaged state. As can be appreciated, this can prevent unauthorized users from being located exterior to the door 202 of the electronic lock 100 and taking advantage of an authorized mobile device that may be located on the interior of the door 202, even though that authorized mobile device is not being used to actuate the motor 116. However, such a feature is not required, but can add additional security. In alternative arrangements, the motor 116 may be actuatable from either the credential input mechanism 112 or from an application installed on a user's mobile device. In such arrangements, the exterior antenna 1902 and/or interior antenna 1908 may be excluded.

The exterior assembly 212 may further include the processing unit 1910 and the motor 116. As shown, the processing unit 1910 includes at least one processor 1912 communicatively connected to a security chip 1914, a memory 1916, various wireless communication interfaces (e.g., including a Wi-Fi® interface 1918 and/or a Bluetooth® interface 1920, and a battery 1922). The processing unit 1910 is capable of controlling the engagement state of the electronic lock 100 (e.g., by actuating the motor 116 to actuate and drivably couple the bezel assembly 140 to the latch assembly 160.

In some examples, the processor 1912 can process signals received from a variety of devices to determine whether the motor 116 should be actuated. Such processing can be based on a set of preprogramed instructions (i.e., firmware) stored in the memory 1916. In certain embodiments, the processing unit 1910 can include a plurality of processors 1912, including one or more general purpose or specific purpose instruction processors. In some examples, the processing unit 1910 is configured to capture a credential input event from a user and store the credential input event in the memory 1916. In other examples, the processor 1912 receives a signal from the exterior antenna 1902, the interior antenna 1908, or a motion sensor 1924 (e.g., a vibration sensor, gyroscope, accelerometer, motion/position sensor, or combination thereof) and can validate received signals in order to actuate the motor 116 to control the engagement state of the electronic lock 100. In still other examples, the processor 1912 receives signals from the Bluetooth® interface 1920 to determine whether to actuate the motor 116.

In some embodiments, the processing unit 1910 includes a security chip 1914 that is communicatively interconnected with one or more instances of the processor 1912. The security chip 1914 can, for example, generate and store cryptographic information usable to generate a certificate usable to validate the electronic lock 100 with a remote system, such as a server or a mobile. In certain embodiments, the security chip 1914 includes a one-time write function in which a portion of memory of the security chip 1914 can be written only once, and then locked. Such memory can be used, for example, to store cryptographic information derived from characteristics of the electronic lock 100. Accordingly, once written, such cryptographic information can be used in a certificate generation process which ensures that, if any of the characteristics reflected in the cryptographic information are changed, the certificate that is generated by the security chip 1914 would become invalid, and thereby render the electronic lock 100 unable to perform various functions, such as communicate with a server or mobile device, or operate at all, in some cases.

The memory 1916 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 1910 can include one or more wireless interfaces, such as the Wi-Fi® interface 1918 and/or the Bluetooth® interface 1920. Other RF circuits can be included as well. In the example shown, the Wi-Fi® interface 1918 and/or the Bluetooth® interface 1920 are capable of communication using at least one wireless communication protocol. In some examples, the processing unit 1910 can communicate with a remote device via the Wi-Fi® interface 1918, or a local device via the Bluetooth® interface 1920. In some examples, the processing unit 1910 can communicate with a mobile device and a server via the Wi-Fi® interface 1918, and can communicate with a mobile device when the mobile device is in proximity to the electronic lock 100 via the Bluetooth® interface 1920. In some embodiments, the processing unit 1910 is configured to communicate with a mobile device via the Bluetooth® interface 1920, and communications between the mobile device and the electronic lock 100 when the mobile device is out of range of Bluetooth® can be relayed via a server using the Wi-Fi® interface 1918.

In example aspects, various wireless protocols can be used. For example, the electronic lock 100 can utilize one or more wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

According to an embodiment, the processor 1912 may receive a signal at the Bluetooth® interface 1920 via a wireless communication protocol (e.g., BLE) from a mobile device for communication of an intent to actuate the motor 116 to control the engagement state of the electronic lock 100. In some examples, the processor 1912 may initiate communication with a server via the Wi-Fi® interface 1918 (or another wireless interface) for purposes of validating an attempted actuation of the motor 116 to control the engagement state of the electronic lock 100, or receiving an actuation command to actuate the motor 116 to control the engagement state of the electronic lock 100. Additionally, various other settings can be viewed and/or modified via the Wi-Fi® interface 1918 from a server; as such, a user of a mobile device may access an account associated with the electronic lock 100 to view and modify settings of that lock, which are then propagated from the server to the electronic lock 100. In alternative embodiments, other types of wireless interfaces can be used; generally, the wireless interface used for communication with a mobile device can operate using a different wireless protocol than a wireless interface used for communication with a server.

The exterior assembly 212 also includes the motor 116 that is capable of actuating the engagement mechanism 120. In use, the motor 116 receives an actuation command from the processing unit 1910, which causes the motor 116 to actuate the engagement mechanism 120 to place the lock 100 in an engaged state. In some examples, the motor 116 actuates the engagement mechanism to an opposing state. In some examples, the motor 116 receives a specified engage command responsive to a selection of the single-touch actuator 232, where the motor 116 only actuates the engagement mechanism 120 if the latch bolt 166 is in the unlocked position. For example, if the door 202 is locked and the processing unit 1910 receives an indication of a selection of the single-touch actuator 232, then no action is taken. If the latch bolt 166 is in the unlocked position and the processing unit 1910 receives an indication of a selection of the single-touch actuator 232, then the motor 116 actuates the engagement mechanism 120 to place the lock 100 in an engaged state such that manual rotation of the bezel 142 extends the latch bolt 166 in the locked position.

The interior assembly 210 may include one or more batteries 1922 to power the electronic lock 100. In one example, the batteries 1922 may be a standard single-use (disposable) battery. Alternatively, the batteries 1922 may be rechargeable. In still further embodiments, the batteries 1922 are optional, replaced by an alternative power source (e.g., an AC power connection).

In alternative embodiments, the processing unit 1910 may be located within the interior assembly 210. In such an arrangement the processing unit 1910 may receive signals from the exterior circuitry 1906, and may actuate the motor 116 via an electrical connection between the interior assembly 210 and the exterior assembly 212 through the bore 214 in the door 202.

In still further example embodiments, the electronic lock 100 can include an integrated motion sensor 1924. Using such a motion sensor 1924 (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device in proximity to the electronic lock 100. In alternative embodiments, other lock engagement sequences may not require use of a motion sensor 1924. For example, if a mobile device is in valid range of the electronic lock 100 when using a particular wireless protocol (e.g., Bluetooth Low Energy), then a connection may be established with the electronic lock 100. Other arrangements are possible as well, using other connection sequences and/or communication protocols.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. An electronically-controlled, manually-actuated lock comprising:

a motor;

an actuating spindle actuatable by the motor and positioned to rotate around a first axis in response to actuation of the motor, the actuating spindle comprising a driving pin that engages a transmission spring such that, upon rotation of the actuating spindle, a position of the transmission spring changes relative to the driving pin along the first axis between a neutral position and a biasing position;

a bezel assembly positioned to rotate around a second axis and comprising a bezel rotatably coupled to a sleeve within which a bore is defined that is operatively engageable by a pin movable between an engaged position, in which the pin partially resides within and extends through the bore and is received in a recess defined in a coupling, and a disengaged position, in which the pin is disengaged from the coupling;

a flange at least partially surrounding the bezel assembly, the pin, and an actuator spring, the flange being engageable by the transmission spring at least when the transmission spring is in the biasing position, the flange being movable between a first position and a second position, wherein:

the flange remains in the first position when the transmission spring is in the neutral position;

the flange is biased toward the second position when the transmission spring is in the biasing position; and biasing the flange toward the second position compresses the actuator spring, which pushes the pin toward the engaged position; and a deadbolt latch assembly including:

a latch bolt movable between a locked position and an unlocked position; and a torque blade rotatably coupled to the coupling and drivably coupled to the latch bolt, wherein, when the pin is in the engaged position, manual rotation of the bezel around the second axis rotates the torque blade around the second axis and drives movement of the latch bolt from the locked position to the unlocked position or from the unlocked position to the locked position.

2. The electronically-controlled, manually-actuated lock of claim 1, further comprising:

a credential input mechanism configured to receive a user credential input; and a control circuit coupled in electrical communication with the credential input mechanism and the motor, wherein the control circuit is configured with control logic to:

discriminate between a valid credential input and an invalid credential input; and when a valid credential input is received, actuate the motor.

3. The electronically-controlled, manually-actuated lock of claim 2, wherein the credential input mechanism includes at least one of:

a keypad;

a biometric sensor; and a wireless interface.

4. The electronically-controlled, manually-actuated lock of claim 1, wherein when the flange is in the first position, the pin is retained in the disengaged position by the actuator spring.

5. The electronically-controlled, manually-actuated lock of claim 4, wherein:

when the pin is in the disengaged position, the bezel assembly is not drivably coupled to the deadbolt latch assembly; and manual rotation of the bezel does not drive movement of the latch bolt from the locked position to the unlocked position or from the unlocked position to the locked position.

6. The electronically-controlled, manually-actuated lock of claim 5, wherein after a predetermined time period, the motor is actuated to rotate the actuating spindle in an opposite direction around the first axis to move the position of the transmission spring from the biasing position to the neutral position and cause the flange to move to the first position.

7. The electronically-controlled, manually-actuated lock of claim 2, further comprising:

a single-touch actuator in electrical communication with the control circuit;

a switch coupled in electrical communication with the control circuit and engageable by a turn piece rotatably coupled to the torque blade, wherein:

when the latch bolt is in the locked position, the turn piece is rotated to a locked position and the switch is moved to an engaged position;

when the latch bolt is in the unlocked position, the turn piece is rotated to an unlocked position and the switch is moved to a disengaged position; and when a selection of the single-touch actuator is received and when the switch is in the disengaged position, the control circuit is configured to actuate the motor to rotate the actuating spindle to change the position of the transmission spring to the biasing position to drivably couple the bezel assembly to the deadbolt latch assembly.

8. The electronically-controlled, manually-actuated lock of claim 1, further comprising a circumferential spring positioned around at least a portion of a circumference of the bezel assembly, the circumferential spring biasing the bezel to a home position.

9. A method for operating an electronically-controlled, manually-actuated lock, comprising:

in response to receiving a valid user credential input, actuating a motor via a control circuit to rotate an actuating spindle around a first axis, the actuating spindle comprising a driving pin that engages a transmission spring to move the transmission spring along the first axis from a neutral position to a biasing position, wherein:

movement of the transmission spring to the biasing position biases a movable flange from a first position to a second position;

biasing the flange to the second position compresses an actuator spring, which pushes a pin toward an engaged position, and in the engaged position, the pin engages a bezel assembly and a coupling rotatably coupled to a torque blade that is further drivably coupled to a latch bolt; and in response to receiving a manual rotation of a bezel included in the bezel assembly around a second axis, rotating the torque blade around the second axis and driving the latch bolt to a locked position or an unlocked position.

10. The method of claim 9, further comprising:

receiving the user credential input, wherein the user credential input is received via a credential input mechanism operatively connected to the control circuit; and determining whether the user credential input is a valid credential input or an invalid credential input, wherein the determination is made via the control circuit using control logic.

11. The method of claim 10, wherein receiving the user credential input comprises at least one of:

receiving a passcode input via a keypad;

receiving a biometric input via a biometric sensor; and receiving a wireless signal via a wireless interface.

12. The method of claim 10, further comprising retaining the pin in a disengaged position by the actuator spring when the flange is in the first position, wherein when the pin is in the disengaged position:

the bezel assembly is not drivably coupled to the latch bolt; and manual rotation of the bezel does not drive movement of the latch bolt from the locked position to the unlocked position or from the unlocked position to the locked position.

13. The method of claim 12, wherein after a predetermined time period, actuating the motor via the control circuit to rotate the actuating spindle in an opposite direction around the first axis to move the position of the transmission spring from the biasing position to the neutral position and cause the flange to move to the first position.

14. The method of claim 9, further comprising:

receiving a selection of a single-touch actuator in electrical communication with the control circuit;

determining whether a switch, coupled in electrical communication with the control circuit and engageable by a turn piece rotatably coupled to the torque blade, is in an engaged position or a disengaged position, wherein:

the switch is in the engaged position when the latch bolt is in the locked position and the turn piece is rotated to a locked position; and the switch is in the disengaged position when the latch bolt is in the unlocked position and the turn piece is rotated to an unlocked position; and when the switch is in the disengaged position, actuating the motor to rotate the actuating spindle to change the position of the transmission spring to the biasing position to engage the pin with the bezel assembly and the coupling to drivably couple the bezel assembly to the latch bolt.

15. A locking assembly for use on a door separating an exterior space from a secured space, comprising:

an electronic actuating mechanism comprising a motor for actuating an engagement mechanism to drivably couple a bezel assembly to a latch assembly via a coupling mechanism;

the engagement mechanism comprising:

an actuating spindle including a driving pin, wherein:

the actuating spindle is positioned to rotate around a first axis in response to actuation of the motor; and upon rotation of the actuating spindle, the driving pin is configured to engage a transmission spring and bias the transmission spring relative to the driving pin along the first axis between a neutral position and a biasing position; and a flange engageable by the transmission spring at least when the transmission spring is in the biasing position, the flange being movable between a first position and a second position, wherein the flange is biased toward the second position when the transmission spring is in the biasing position;

the coupling mechanism, comprising:

an actuator spring engageable by the flange, wherein the actuator spring is decompressed when the flange is in the first position and compressed when the flange is biased toward the second position;

a pin engageable by the actuator spring and movable between a disengaged position and an engaged position; wherein the pin is moved to the engaged position when the actuator spring is compressed; and a coupling drivably coupled to the latch assembly and within which a recess is defined and dimensioned to receive the pin, wherein the coupling receives the pin when the pin is in the engaged position;

the bezel assembly, comprising:

a bezel positioned to rotate around a second axis; and a sleeve rotatably coupled to the bezel and within which a bore is defined that is operatively engageable by the pin; wherein:

when the pin is in the engaged position, the pin partially resides within and extends through the bore and is received in the recess defined in the coupling; and when the pin is in the disengaged position, the pin is disengaged from the coupling; and the latch assembly, comprising:

a latch bolt movable between a locked position and an unlocked position;

a latch spindle configured to drive movement of the latch bolt between the locked position and the unlocked position; and a torque blade rotatably coupled to the coupling and drivably coupled to the latch spindle, wherein when the pin is in the engaged position, manual rotation of the bezel around the second axis rotates the torque blade around the second axis and causes the latch spindle to drive movement of the latch bolt from the locked position to the unlocked position or from the unlocked position to the locked position.

16. The locking assembly of claim 15, wherein the electronic actuating mechanism further comprises a credential input mechanism for receiving a user credential input used to validate a user.

17. The locking assembly of claim 16, wherein the credential input mechanism includes at least one of:

a keypad for receiving a passcode input;

a biometric sensor for receiving a biometric input; and a wireless interface for receiving a wireless signal.

18. The locking assembly of claim 16, wherein the electronic actuating mechanism further comprises a control circuit operatively connected to the credential input mechanism and configured to:

determine, using control logic, whether the user credential input is a valid credential input or an invalid credential input; and when a determination is made that the user credential input is valid, send a signal to the motor to actuate the motor to rotate the actuating spindle.

19. The locking assembly of claim 15, wherein:

movement of the latch bolt from the locked position to the unlocked position comprises a retraction of the latch bolt; and movement of the latch bolt from the unlocked position to the locked position comprises an extension of the latch bolt.

20. The locking assembly of claim 15, wherein after a predetermined time period, the motor is actuated to rotate the actuating spindle in an opposite direction around the first axis to move the position of the transmission spring from the biasing position to the neutral position and cause the flange to move to the first position, causing the actuator spring to decompresses and disengage the pin from the coupling.

21. The locking assembly of claim 18, further comprising:

a single-touch actuator in electrical communication with the control circuit;

a switch coupled in electrical communication with the control circuit and engageable by a turn piece rotatably coupled to the torque blade, wherein:

when the latch bolt is in the locked position, the turn piece is rotated to a locked position and the switch is moved to an engaged position;

when the latch bolt is in the unlocked position, the turn piece is rotated to an unlocked position and the switch is moved to a disengaged position; and when a selection of the single-touch actuator is received and when the switch is in the disengaged position, the control circuit is configured to actuate the motor to rotate the actuating spindle to change the position of the transmission spring to the biasing position to drivably couple the bezel assembly to the deadbolt latch assembly.

* * * * *